(12) United States Patent
Crouch et al.

(10) Patent No.: US 10,063,264 B2
(45) Date of Patent: Aug. 28, 2018

(54) REAL TIME POLARIZATION COMPENSATION FOR DUAL-POLARIZED MILLIMETER WAVE COMMUNICATION

(71) Applicant: Raytheon Company, Waltham, MA (US)

(72) Inventors: David D. Crouch, Corona, CA (US); Kenneth W. Brown, Yucaipa, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 15/164,959

(22) Filed: May 26, 2016

(65) Prior Publication Data

US 2017/0033810 A1    Feb. 2, 2017

Related U.S. Application Data

(60) Provisional application No. 62/197,914, filed on Jul. 28, 2015.

(51) Int. Cl.
*H04B 7/10* (2017.01)
*H04B 1/04* (2006.01)
(Continued)

(52) U.S. Cl.
CPC ......... *H04B 1/0475* (2013.01); *H01Q 15/244* (2013.01); *H01Q 15/246* (2013.01);
(Continued)

(58) Field of Classification Search
CPC ......... H04B 1/0475; H04B 7/10; H04L 27/04; H01Q 13/0258; H01Q 15/244; H01Q 15/246; H01Q 21/245
(Continued)

(56) References Cited

U.S. PATENT DOCUMENTS 3,588,751 A   6/1971 Palne .................... 222/6
3,827,051 A   7/1974 Foldes
(Continued)

OTHER PUBLICATIONS

International Search Report and Written Opinion of ISA dated Jan. 2, 2017; for PCT Pat. App. No. PCT/US2016/034213; 13 pages.
(Continued)

*Primary Examiner* — Michael Neff
(74) *Attorney, Agent, or Firm* — Daly, Crowley, Mofford & Durkee, LLP

(57) ABSTRACT

A communication system comprises a signal generator, polarizer, signal combiner, transmitter, positioning device, and controller. The signal generator converts first and second received data streams into respective first and second orthogonal linearly polarized signals. The polarizer is at a first rotation angle and converts first and second orthogonal linearly polarized signals into, respectively, a first right-hand-circularly polarized (RHCP) signal and first left-hand circularly polarized (LHCP) signal, which are combined in signal combiner into a signal sent by transmitter to a receiver. The positioning device adjusts the first rotation angle to substantially increase isolation between third and fourth orthogonal linearly polarized signals at the receiver. The controller performs the real-time analysis of transmission loss and directs the positioning device to adjust the first rotation angle.

20 Claims, 18 Drawing Sheets

(51) Int. Cl.
*H04L 27/04* (2006.01)
*H01Q 15/24* (2006.01)
*H01Q 21/24* (2006.01)
*H01Q 13/02* (2006.01)

(52) U.S. Cl.
CPC ............ *H01Q 21/245* (2013.01); *H04B 7/10* (2013.01); *H04L 27/04* (2013.01); *H01Q 13/0258* (2013.01)

(58) Field of Classification Search
USPC ........................................................ 375/296
See application file for complete search history.

(56) References Cited

U.S. PATENT DOCUMENTS

| | | | |
|---|---|---|---|
| 4,143,263 A | 3/1979 | Eichweber | 250/999 |
| 5,583,515 A | 12/1996 | Marumoto | |
| 6,006,070 A | 12/1999 | Wong | |
| 7,680,516 B2 | 3/2010 | Lovberg et al. | 455/562.1 |
| 8,064,774 B2 | 11/2011 | Yu et al. | 398/168 |
| 9,031,418 B2 | 5/2015 | Yuki et al. | 398/184 |
| 2003/0184476 A1* | 10/2003 | Sikina | H01Q 3/36 343/700 MS |

OTHER PUBLICATIONS

Dr. Richard W. Ridgway et al., "100 Gb/s RF Backbone (100G)—Proposers Day Briefing,", Jan. 9, 2013, 23 pages.

Jiho Song et al., "Adaptive Millimeter Wave Beam Alignment for Dual-Polarized MIMO Systems," May 18, 2015, 12 pages.

Charles L.H. Hull et al., "1 mm Dual-Polarization Science with CARMA," Aug. 21, 2014, 4 pages.

PCT International Preliminary Report dated Feb. 8, 2018 corresponding to International Application No. PCT/US2016/034213; 10 Pages.

Response filed on Jul. 11, 2018 to EPO Patent Office Communication dated Mar. 7, 2018 inviting applicant to correct deficiencies in PCT International Preliminary Report dated Feb. 8, 2018; Application No. 16805649.9, 20 pages.

\* cited by examiner

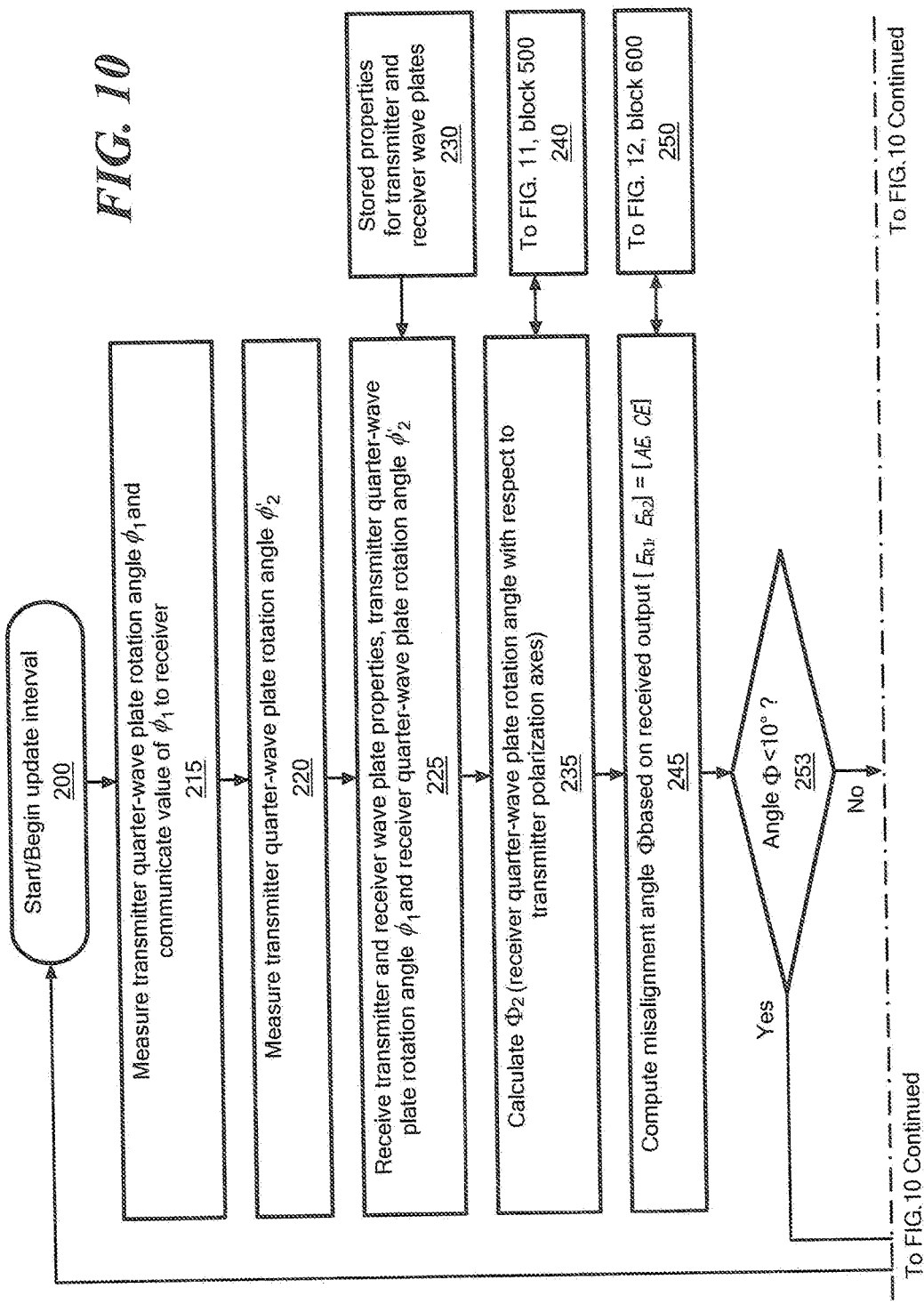

REAL TIME POLARIZATION COMPENSATION FOR DUAL-POLARIZED MILLIMETER WAVE COMMUNICATION

CROSS REFERENCE TO RELATED APPLICATIONS

This application claims priority to U.S. Provisional Patent Application No. 62/197,914, entitled "REAL TIME POLARIZATION COMPENSATION FOR DUAL-POLARIZED MILLIMETER WAVE COMMUNICATION,", filed on Jul. 28, 2015, which is incorporated herein by reference.

STATEMENT REGARDING FEDERALLY SPONSORED RESEARCH

This invention was made with government support under the government contract HR0011-13-C-0076 of Aug. 26, 2013, awarded by the United States Department of Defense. The government has certain rights in the claimed subject matter. This contract is hereby incorporated by reference.

FIELD

At least some embodiments described herein relate to microwave and millimeter-wave communication systems. More specifically, certain embodiments described herein relate to systems, methods, and apparatuses for reducing cross-channel interference in a high-speed dual-polarized point-to-point communications link.

BACKGROUND

High-speed communication systems can operate by encoding information (e.g., data) onto radio waves that typically propagate along paths in free space. There are various ways to encode information onto a radio wave, as is understood by those in the art, including but not limited to Quadrature Amplitude Modulation (QAM), which uses both amplitude and phase information. Various factors (such as defects, misalignments, and orientation issues in optical components at the transmitter and/or receiver) can distort the transmitted polarization states in a random manner putting some of the power of an intended transmitted polarization state, corresponding for example to a digital one, into the other polarization state, corresponding to an unintended digital zero, or causing a signal in one polarization state to interfere with that of another polarization. When power is received in both polarization states in a level sufficient to interfere with accurate transmissions of the ones and zeroes, crosstalk (also referred to herein as cross-channel interference) is said to be present.

In addition, some coding schemes to encode information on radio wave require high levels of isolation at the receiver between the two data streams to guarantee accurate reception (i.e., with a bit error rate of less than $10^{-9}$, one erroneous received bit per 1 billion transmitted bits).

At least some existing point-to-point communication systems use different types of polarizations, including orthogonal polarizations, to increase the data rate, and such systems typically correct for the above-described crosstalk or cross-channel interference digitally. At ultra-high data rates (>50 Gbps), the added computational burden resulting from correcting for cross-channel interference can become onerous, particularly on applications such as unmanned airborne platforms, where size, weight, and power are constrained. If communication platforms (including but not limited to unmanned airborne platforms, airborne communication, etc.) are in relative motion, use of circular polarization can be advantageous. Effective use of polarization in communications systems can require that the transmitter (sender of information) be aligned in some way with the receiver (recipient of information), but this can be challenging if one or both of the sender and receiver are in motion. Misalignment can add further to the cross-channel interference.

One way to achieve circular polarization is through the use of wave plates (also known as retarders). Wave plates can, in some instances, be used as optical devices used to change the type of polarization of a light wave that travels through the plate. Wave plates do this by retarding (or delaying) one component of polarization with respect to its orthogonal component.

For example, in the optical set of wavelengths, quarter-wave plates (also referred to as ¼ λ plate) can be used to convert linearly polarized light into circularly polarized light or (in some instances) elliptically polarized light (and vice versa). Linearly polarized light can be transformed into circularly polarized light, and vice versa, by orienting a linear polarizer and quarter wave plate in a predetermined orientation. For example, a quarter wave plate with its axes oriented at 45° to linear polarization produces circular polarization. Conversely, a circular polarization (which does not have a specific orientation), passing through quarter wave plate produces linear polarization at 45° to the wave plate's axis. If linearly polarized light enters a quarter-wave plate at any angle besides 45°, the light becomes elliptically polarized. Thus, in an example communications system, having a transmitter and receiver, quarter wave plates can be used to convert linear to circular polarization at the transmitter, and back to linear at the receiver. This is but one way to convert linear to circular polarization.

In implementations that use millimeter wavelengths, linear-to-circular polarizers (referred to simply as "polarizers") converts incident linear polarization from a first side to circular polarization on a second side, and incident circular polarization on a second side to linear polarization on a first side

SUMMARY

When quarter wave plates are used in point to point communications applications, especially as part of implementations of circular polarization, certain issues can arise. For example, non-ideal quarter-wave plate performance can degrade channel-to-channel isolation in communications applications. Another issue that can occur is if, for a given quarter wave plate, circular polarization is expected, but the actual polarization may be slightly or substantially elliptical, such that the polarization has a net linearly polarized component along some particular direction. This can occur, for example, if one polarization (of the two linear polarizations) is transmitted more or less efficiently than the other (e.g., one polarization experiences a loss, e.g., 10%).

It is advantageous to mitigate non-ideal quarter-wave plate performance if ultra-high data rates are to be realized using high-order modulation (e.g. 32-QAM). In particular, emerging airborne millimeter-wave communication systems (such as the aforementioned 100G system) may need this high-order modulation and dual polarizations to realize fiber-optic equivalent data rates.

As at least some of the embodiments that are herein illustrate, wave plates/polarizers can be used in other portions of the spectrum besides the optical spectrum, as well.

For example, in at least one embodiment described herein, millimeter-wave polarizers are used as part of the described implementation.

In one embodiment, a high-speed point-to-point communications link may utilize dual orthogonal polarizations to increase the data rate, with each polarization carrying a separate and independent data stream. Dual circular polarization is used to mitigate misalignment between transmitter and receiver. In a mobile application, transmitter and receiver platform motion may make it difficult or impossible to keep the receiver aligned with the transmitter. By encoding the transmitted information on right- and left-hand circularly-polarized waves, the data streams can be decoupled from the platform misalignment. To achieve very high data rates requires the use of high-order modulation/ encoding schemes such as 32-QAM. Successful implementation requires a high degree of channel-to-channel isolation at the receiver. Non-ideal performance by the quarter-wave plates or polarizers used to convert linear to circular polarization at the transmitter and circular back to linear at the receiver degrades the receiver channel-to-channel isolation. In addition, non-ideal wave plates or polarizers can produce elliptical polarization, which can introduce unacceptable levels of cross-channel interference at the receiver, unless compensated.

It is advantageous to compensate for issues associated with less than ideal quarter-wave plate and/or less than ideal polarizer performance. Hence, a need exists in the art for means of compensating for less-than ideal quarter-wave plate and/or polarizer performance.

In one aspect, an embodiment is provided that actively compensates for effects of imperfect transmitter and receiver polarizer performance using measured performance data and via real time measurements of the receiver-transmitter orientation angle. From this data, orientation-dependent transmitter and receiver rotation angle corrections are derived that significantly reduce cross-channel interference and enable use of high-order modulation. Thus, this aspect can provide active polarization compensation on mobile platforms at millimeter-wave frequencies.

In at least one embodiment, a system, method, and apparatus are provided to compensate, in real time, for at least some of the less-than-ideal quarter-wave plate performance. For example, using measured quarter-wave plate performance parameters (e.g., transmission loss and phase shift for linearly polarized waves parallel to the orthogonal axes of the quarter-wave plate) and real time measurements of the transmitter and receiver quarter-wave plate rotation angles, angular misalignment between the transmitter and receiver is estimated, and rotation angle corrections derived for both transmitter and receiver quarter-wave plates. The corrections are analog adjustments to the quarter-wave plate rotation angles, derived via digital computations and implemented at the rotation angle update rate, which is orders of magnitude lower than the data transmission rate. Rotation angle correction can increase the receiver isolation by 15 dB or more, allowing successful recovery of high-order modulated signals in both channels.

The following presents a simplified summary in order to provide a basic understanding of one or more aspects of the embodiments described herein. This summary is not an extensive overview of all of the possible embodiments, and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

In one aspect, a method is provided for transmitting signals from a first communication node to a second communication node, the method comprising:
  receiving first and second data streams to be transmitted from the first communication node
  converting the first and second data streams to first and second orthogonal linearly polarized signals;
  receiving the first and second orthogonal linearly polarized signals at a first polarizer, the first polarizer oriented at a first rotation angle, wherein the first polarizer converts the first and second orthogonal linearly polarized signals to, respectively, a first right-hand-circularly polarized (RHCP) signal and a first left-hand circularly polarized (LHCP) signal;
  combining the first RHCP signal and first LHCP signal into a transmitted signal having a first signal strength and providing the transmitted signal transmitted to a receiver, and
  adjusting the first rotation angle to substantially increase isolation between third and fourth orthogonal linearly polarized signals at the receiver, wherein the third and fourth orthogonally linearized polarize signals are derived, respectively, from the transmitted signal received at the receiver, and correspond, respectively to transmitted versions of the first and second linearly polarized signals, wherein the adjusting is based at least in part on a real-time analysis of a transmission loss of the of the third and fourth orthogonal linearly polarized signals as compared to the transmitted signal as sent by the transmitter.

In one embodiment, the adjustment of the first rotation angle is further based at least in part on information relating to the second rotation angle of a second polarizer configured to receive the transmitted signal. In one embodiment, the method further comprises providing information usable to adjust the second rotation angle to substantially increase isolation between the third and fourth orthogonal linearly polarized signals at the receiver, wherein the adjusting is based at least in part on the real-time analysis of the transmission loss of the of the third and fourth orthogonal linearly polarized signals as compared to the transmitted signal as sent by the transmitter. In one embodiment, the method further comprises providing information usable to adjust the second rotation angle to substantially increase isolation between the third and fourth orthogonal linearly polarized signals at the receiver, wherein the adjusting is based at least in part on the real-time analysis of the transmission loss of the of the third and fourth orthogonal linearly polarized signals as compared to the transmitted signal as sent by the transmitter. For example, in one embodiment, the computation provides an estimation of the misalignment angle.

In one embodiment, determining the misalignment angle is based at least in part on a real-time measurement of at least one of the first and second rotation angles. In one embodiment, determining the misalignment angle is based at least in part on at least one property of at least one of the first and second polarizers.

In a further embodiment, the method further comprises computing at least one operating point based at least in part on at least one of the first rotation angle, second rotation angle, and at least one property of at least one of the first and second wave plates, wherein the at least one operating point corresponds to a transmitter and receiver rotational angle arrangement configured to achieve at least a predetermined level of isolation between the third and fourth orthogonal linearly polarized signals.

In one embodiment, the at least one operating point corresponds to a transmitter and receiver polarizer rotational angle arrangement that is configured to substantially maximize the level of isolation between the third and fourth orthogonal linearly polarized signals. In one embodiment, at least one of the first and second communication nodes is in motion relative to the other of the first and second communication nodes. In one embodiment, the first and second orthogonal linearly polarized signals are oriented so as to be parallel to the orthogonal axes of the first quarter wave plate. In one embodiment, the second and third orthogonal linearly polarized signals are oriented to be substantially parallel to rotated polarization axes of the second quarter wave plate. In one embodiment, the adjusting of the method comprises dynamically adjusting the first rotation angle in accordance with a predetermined periodic rotation angle update rate.

In another embodiment, the method further comprises:
 measuring at least one of the first and second rotation angles;
 calibrating a phase between the first and second orthogonal linearly polarized signals;
 computing, based at least in part on least one of a property of at least one of the first and second polarizers and on measurement of at least one of the first and second rotation angles, a misalignment angle between the first and second polarizers;
 determining, based at least in part on least one of the property of at least one of the first and second polarizers, on the measurement of at least one of the first and second rotation angles, and on the misalignment angle, a correction angle and phase shift error associated with at least one of the first and second polarizers; and
 rotating at least one of the first and second polarizers to a respective first or second rotation angle selected in accordance with the correction angle and phase shift error, wherein the rotating is configured to substantially compensate for at least one of the misalignment angle and phase shift error between the first and second polarizers.

In another aspect, a communication system is provided, the communication system comprising:
 a signal generator configured to convert first and second received data streams into respective first and second orthogonal linearly polarized signals;
 a first polarizer oriented at a first rotation angle and configured to be in operable communication with the signal generator, the first polarizer further configured to convert the first and second orthogonal linearly polarized signals to respective first and second orthogonal linearly polarized signals wherein the first polarizer converts the first and second orthogonal linearly polarized signals to, respectively, a first right-hand-circularly polarized (RHCP) signal and a first left-hand circularly polarized (LHCP) signal;
 a signal combiner in operable communication with the first polarizer, the signal combiner configured to combine the first RHCP signal and first LHCP signal into a transmitted signal having a first signal strength;
 a transmitter in operable communication with the signal combiner, the transmitter configured to provide the transmitted signal to a receiver;
 a positioning device in operable communication with the polarizer, the positioning device configured to adjust the first rotation angle to substantially increase isolation between third and fourth orthogonal linearly polarized signals at the receiver, wherein the adjusting is based at least in part on a real-time analysis of a transmission loss of the of the third and fourth orthogonal linearly polarized signals, wherein the third and fourth orthogonally linearized polarize signals are derived, respectively, from the transmitted signal received at the receiver, and correspond, respectively to transmitted versions of the first and second linearly polarized signals; and
 a controller in operable communication with the positioning device, the controller configured to perform the real-time analysis and to direct the positioning device to adjust the first rotation angle.

In one embodiment, the adjustment of the first rotation angle is further based at least in part on at least one of: (a) information relating to the second rotation angle of a second polarizer configured to receive the transmitted signal; (b) computation of a misalignment angle between the first and second rotation angles; (c) a real-time measurement of at least one of the first and second rotation angles; and (d) at least one property of at least one of the first and second polarizers.

In one embodiment, the controller is configured to determine at least one operating point based at least in part on at least one of the first rotation angle, second rotation angle, and at least one property of at least one of the first and second polarizers, wherein the at least one operating point corresponds to a transmitter and receiver rotational angle arrangement configured to achieve at least a predetermined level of isolation between the third and fourth orthogonal linearly polarized signals.

In one embodiment, the controller is configured to dynamically adjust the first rotation angle in accordance with a predetermined periodic rotation angle update rate. In one embodiment, at least one of the transmitter and receiver is in motion relative to the other. In one embodiment, the controller is configured to measure at least one of the first and second rotation angles; calibrate a phase between the first and second orthogonal linearly polarized signals; calibrate a phase between the first and second orthogonal linearly polarized signals; determine, based at least in part on least one of the property of at least one of the first and second polarizers, on the measurement of at least one of the first and second rotation angles, and on the misalignment angle, a correction angle and phase shift error associated with at least one of the first and second polarizers; and rotate at least one of the first and second polarizers to a respective first or second rotation angle selected in accordance with the correction angle and phase shift error, wherein the rotating is configured to substantially compensate for at least one of the misalignment angle and phase shift error between the first and second polarizers.

Details relating to these and other embodiments are described more fully herein.

BRIEF DESCRIPTION OF THE DRAWINGS

The advantages and aspects of the described embodiments will be more fully understood in conjunction with the following detailed description and accompanying drawings, in which:

FIG. 5A is a plot of the isolation over the range $0 \leq \phi_{1,2} \leq 180°$, and FIG. 5B shows more clearly the area around the ideal operating point $(\phi_1, \phi_2)$, in accordance with one embodiment;

The drawings are not to scale, emphasis instead being on illustrating the principles and features of the disclosed embodiments. In addition, in the drawings, like reference numbers indicate like elements.

DETAILED DESCRIPTION

The following detailed description is provided, in at least some examples, using the specific context of specific types of millimeter wave communications systems. For example, at least some embodiments herein are usable with and/or as part of systems such as the Defense Advanced Research Project Agency (DARPA) 100 Gb/s RF Backbone system (100G), which is a system that provides an airborne-based communications link with fiber-optic-equivalent capacity and long reach that can propagate through clouds and provide high availability. 100G combines high-order modulation and spatial multiplexing to achieve spectral efficiencies at or above 20 bits-per-second per Hz, where 100G system also provides 100 Gb/s capacity at ranges of 200 km for air-to-air links and 100 km for air-to-ground links from a high-altitude (e.g. 60,000 ft.) aerial platform, and an all-weather (cloud, rain, and fog) capability while maintaining tactically-relevant throughput and link ranges.

It should be understood, however, that the disclosed embodiments are not limited to the 100G system/program or any other systems. It should be appreciated that such references and examples are made in an effort to promote clarity in the description of the concepts disclosed herein. Such references are not intended as, and should not be construed as, limiting the use or application of the concepts, systems, circuits, and techniques described herein to use solely with these or any other systems. For example, it is anticipated that at least some embodiments described herein may have applicability especially to systems that use millimeter waves. Millimeter waves are understood to include at least that part of the spectrum between 30 GHz and 300 GHz (1 GHz=$10^9$ Hz), lower by a factor of more the 1000 compared to visible light. It also is anticipated that at least some of the disclosed embodiments may have applicability with systems that use optical waves. Optical waves are understood to include at least a range of frequencies between 430 to 790 THz (1 THz=$10^{12}$ Hz).

The systems, methods, and apparatuses described herein are anticipated to be usable with many different types of systems, and at least some of the embodiments described herein are applicable to any devices that incorporate any type of wave plate, including but not limited to half and quarter wave plates, that use millimeter communication, that use polarized signals, that transmit light signals, optics systems, radar systems, and/or communications systems, especially high speed communication systems where any part of the communications system (including one or both of the communications points) is moving during any part of the communication.

In the following description, the terms polarizer and quarter-wave plate are, at times, used interchangeably, but their use will be well understood to those in the art, especially depending on the frequency of the communication system.

Figure 1A:
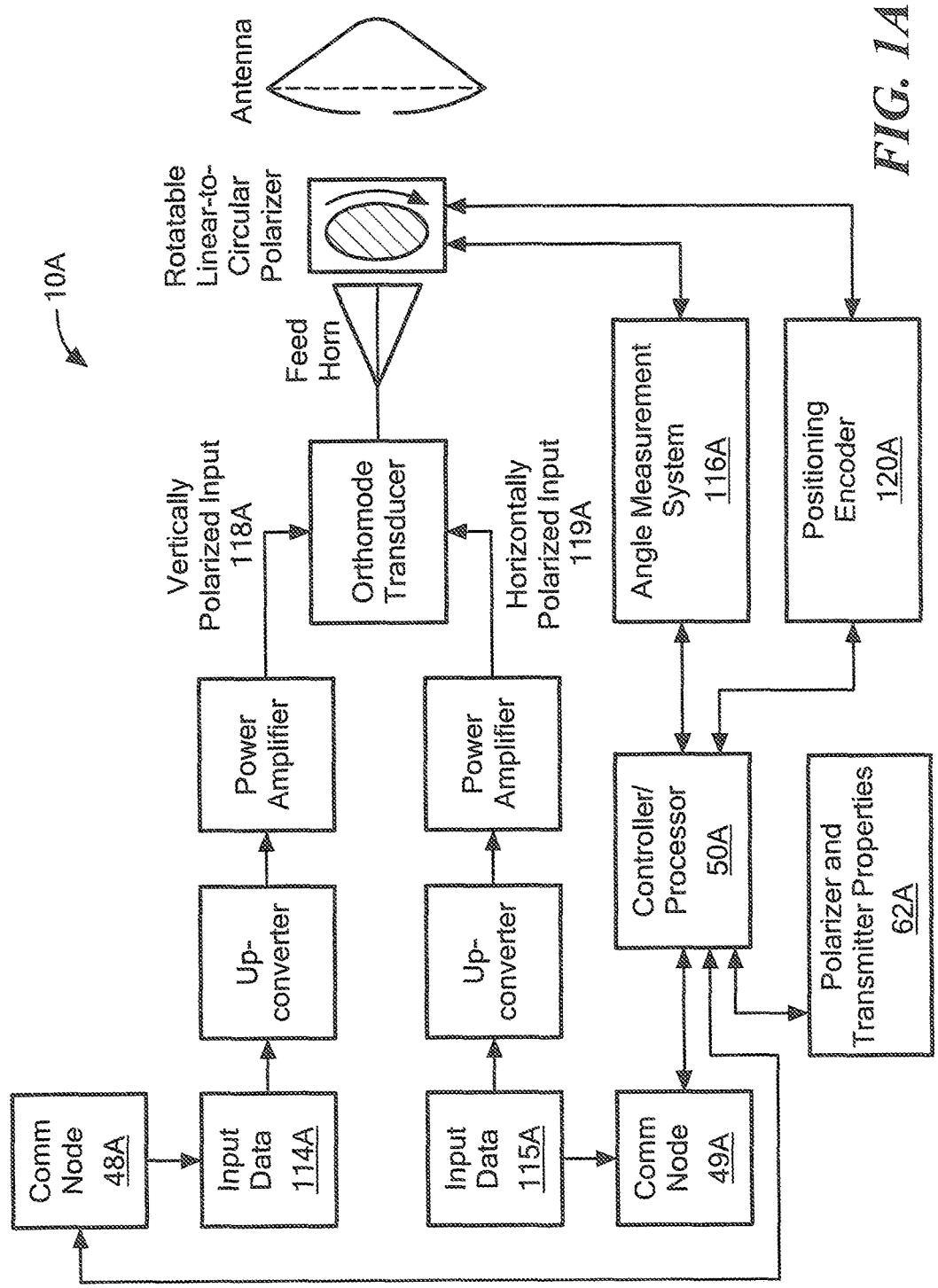
FIG. 1A is a first illustrative system block diagram depicting a first half of a millimeter-wave based communications system, usable at least with the communications link of FIG. 2, the methods of FIGS. 10-12, and the computer system of FIG. 1C4, configured to dynamically control the operating point to reduce cross channel interference, in accordance with one embodiment.
Figure 1B:
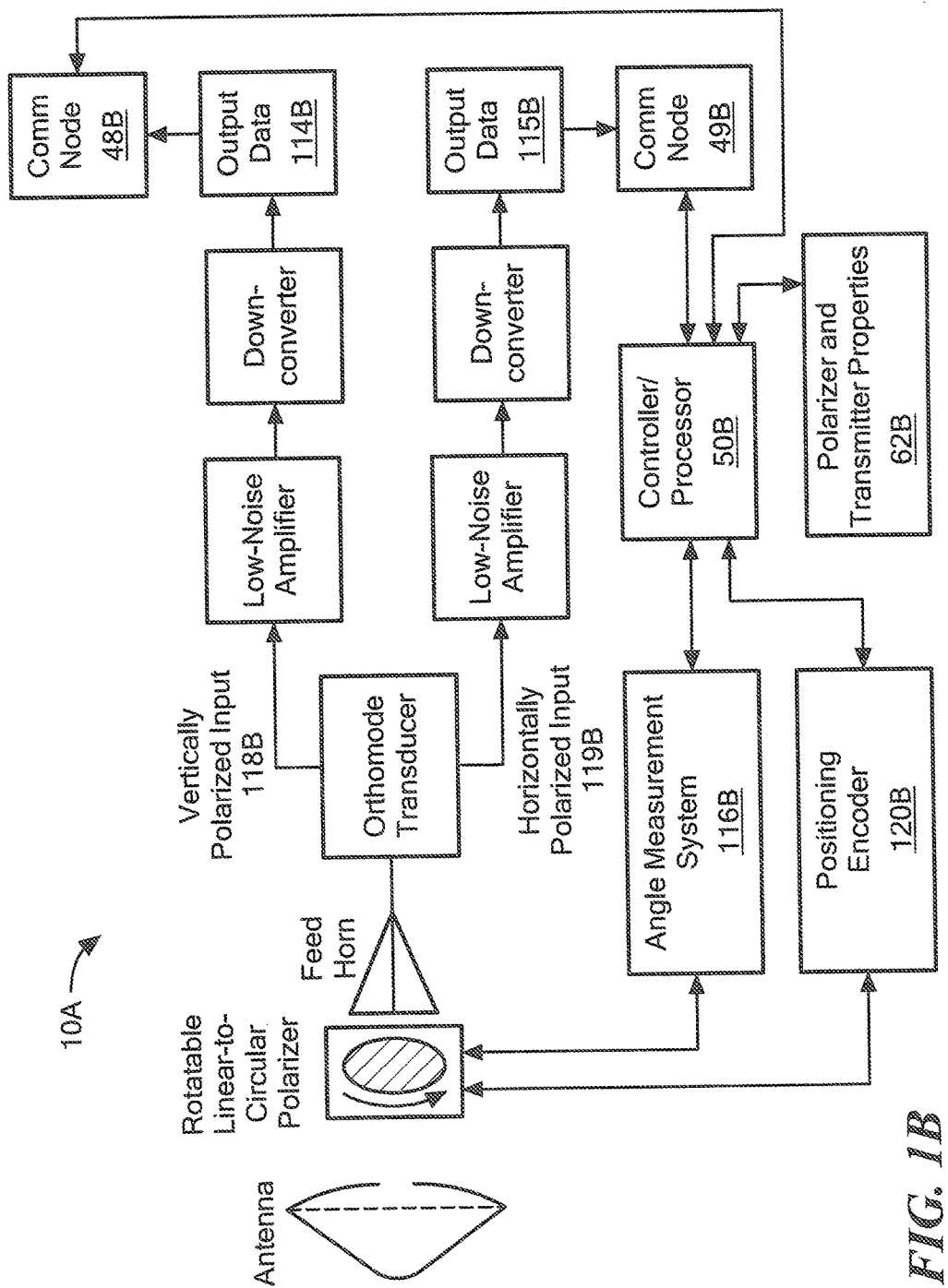
FIG. 1B is a second illustrative system block diagram depicting a second half of the millimeter-wave based communications system of FIG. 1A, usable at least with the communications link of FIG. 2, the methods of FIGS. 10-12, and the computer system of FIG. 1C4, configured to dynamically control the operating point to reduce cross channel interference, in accordance with one embodiment.
Figure 1C:
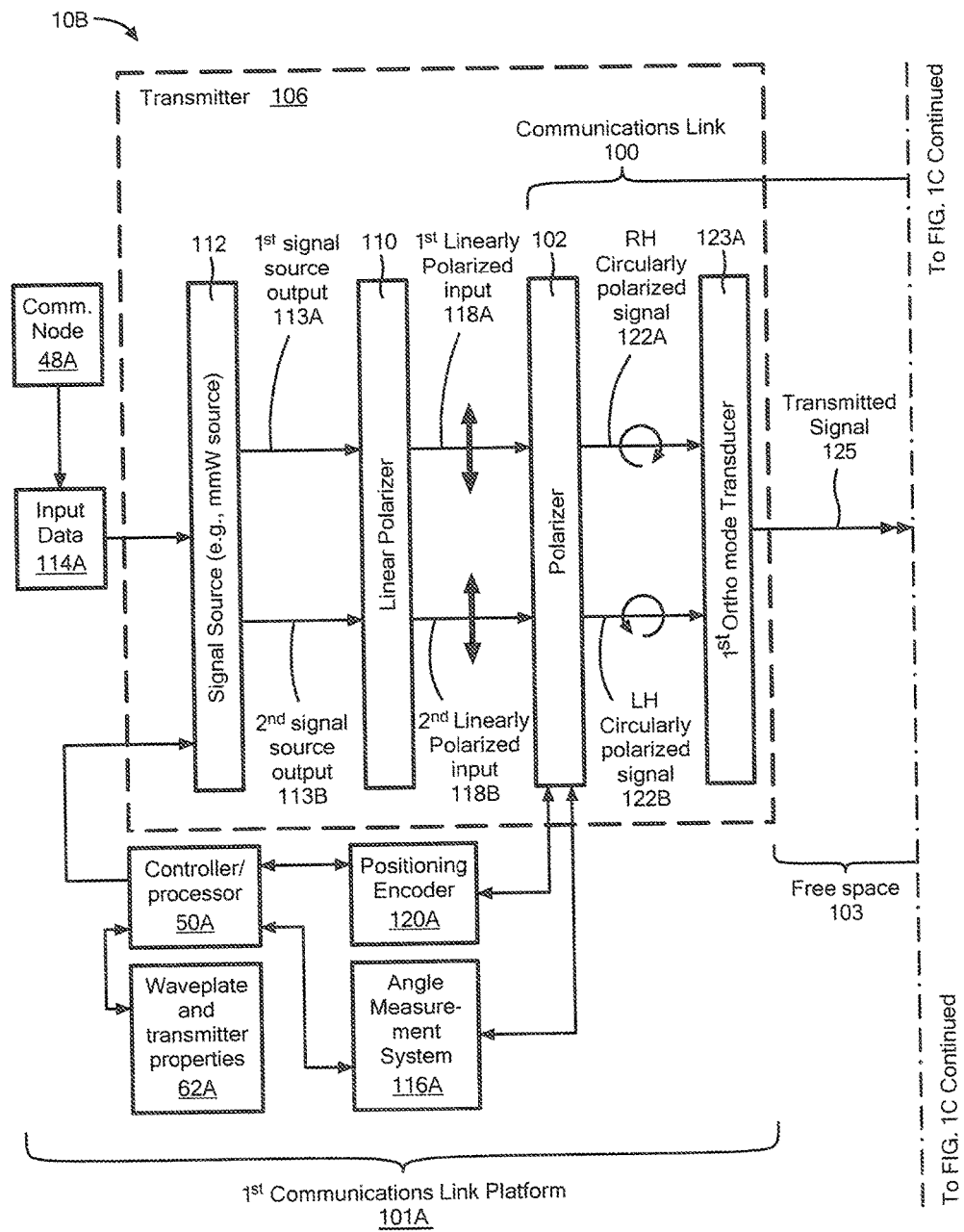
FIG. 1C is a third illustrative system block diagram depicting another millimeter-wave based communications system, usable at least with the communications link of FIG. 2, the methods of FIGS. 10-12, and the computer system of FIG. 1C4, configured to dynamically control the operating point to reduce cross channel interference, in accordance with one embodiment.
Figure 1C:
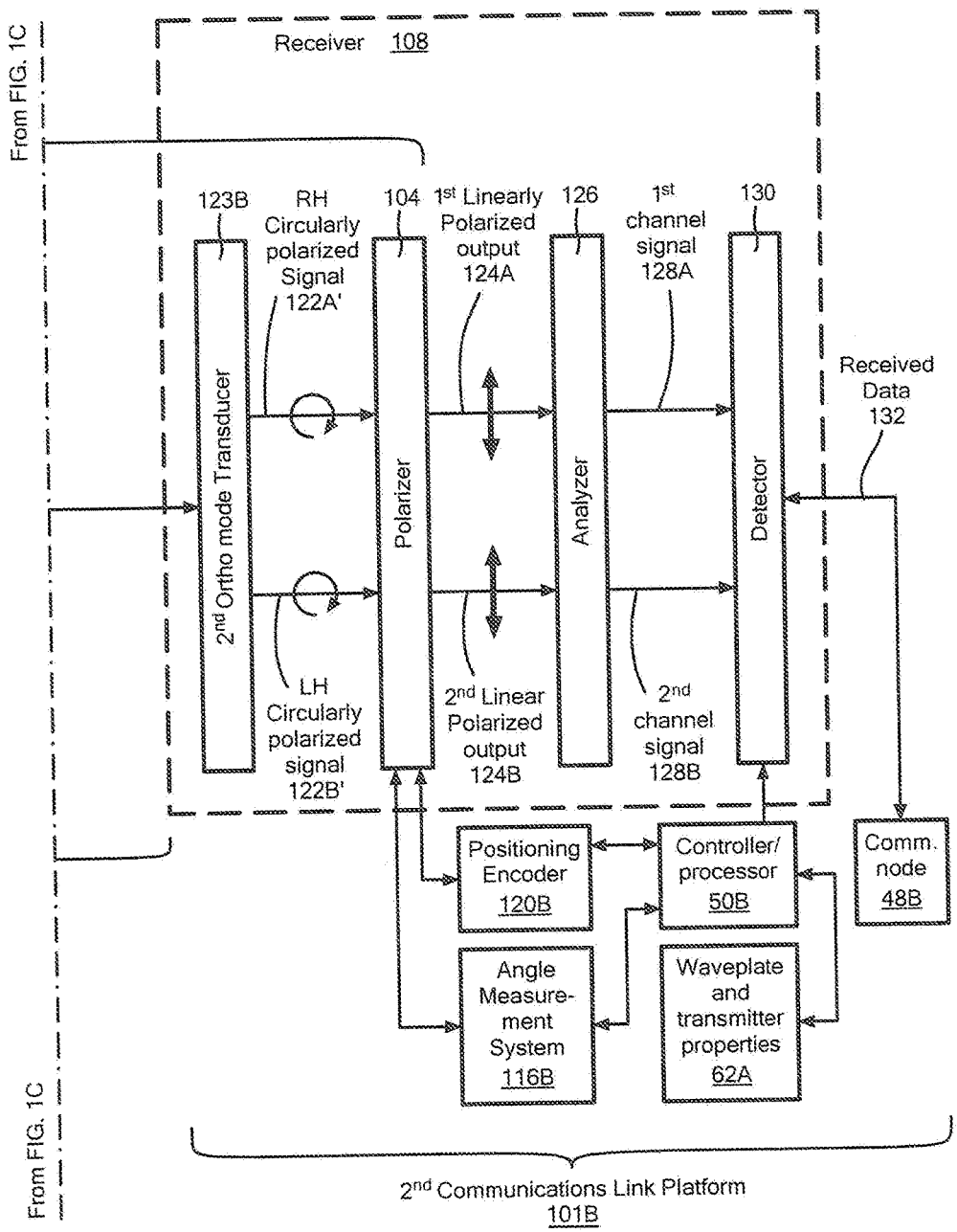
Figure 2:
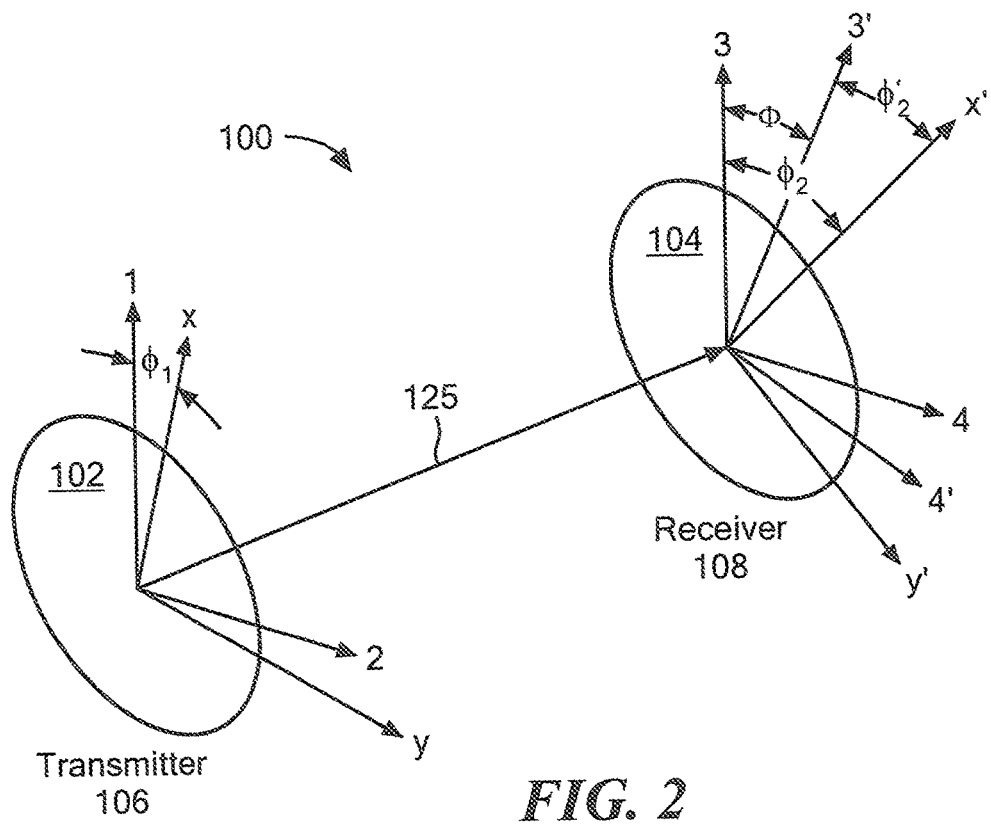
FIG. 2 illustrates in greater detail an exemplary point-to-point communications link utilizing quarter-wave plates at both transmitter and receiver, as usable at least in the system of FIG. 1C, in accordance with one embodiment.
Figure 4A:
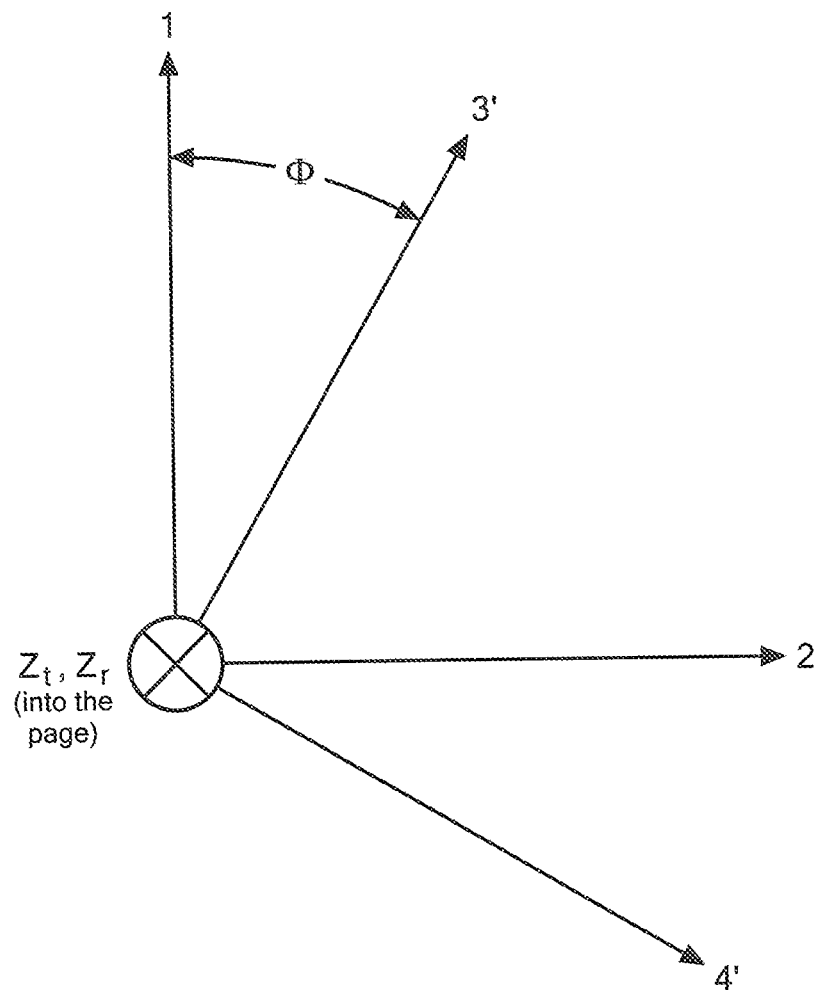
FIG. 4A is an illustration of the axes of FIG. 2, showing rotation of the receiver axes by angle Φ with respect to those of the transmitter.
Figure 10:
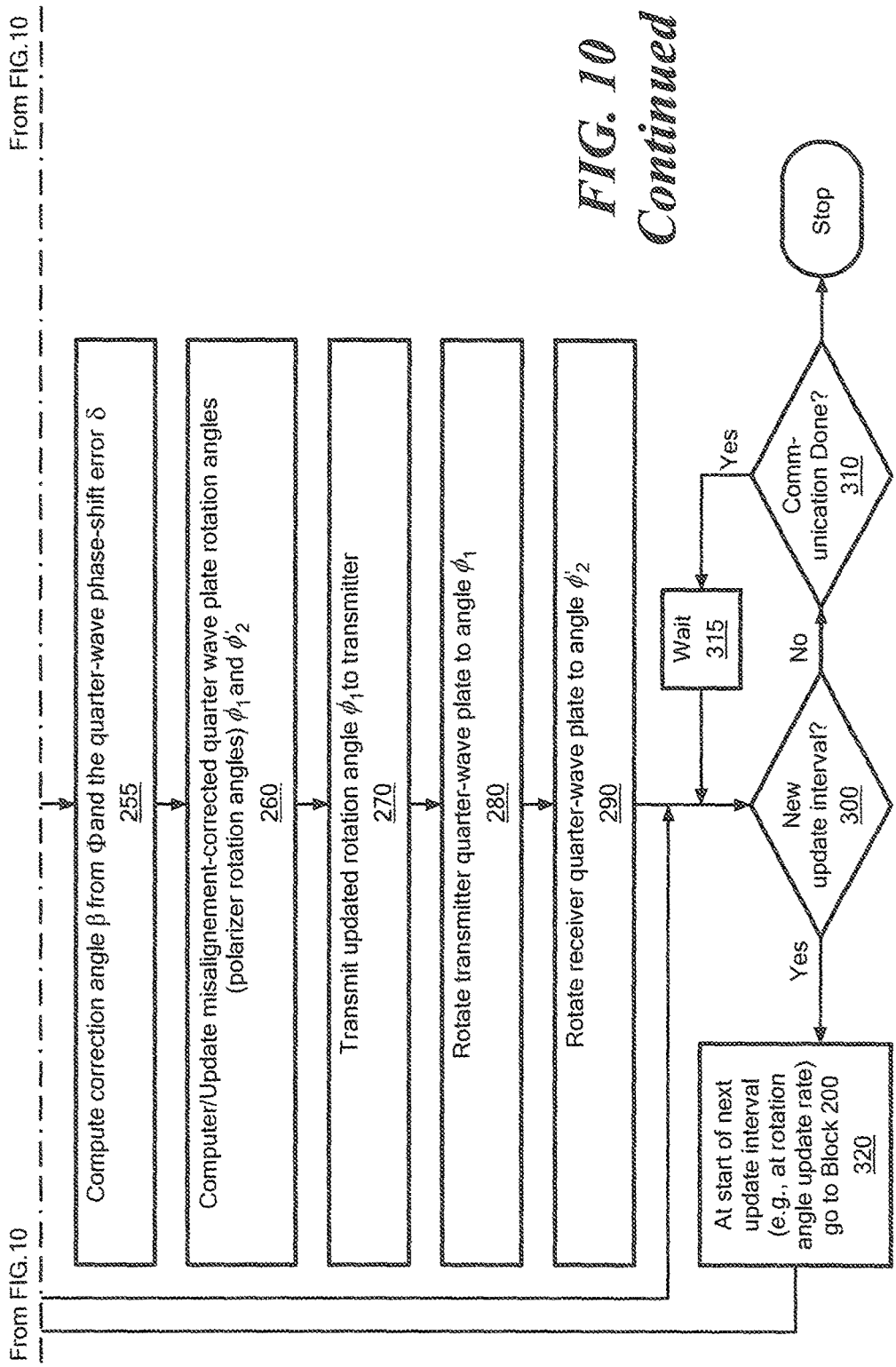
FIG. 10 is an illustrative flow chart of a first exemplary method for determining at least one appropriate operating point, which method is usable with at least some embodiments, including at least the systems of FIGS. 1A-C and the communications link of FIG. 2, in accordance with one disclosed embodiment.
Figure 11:
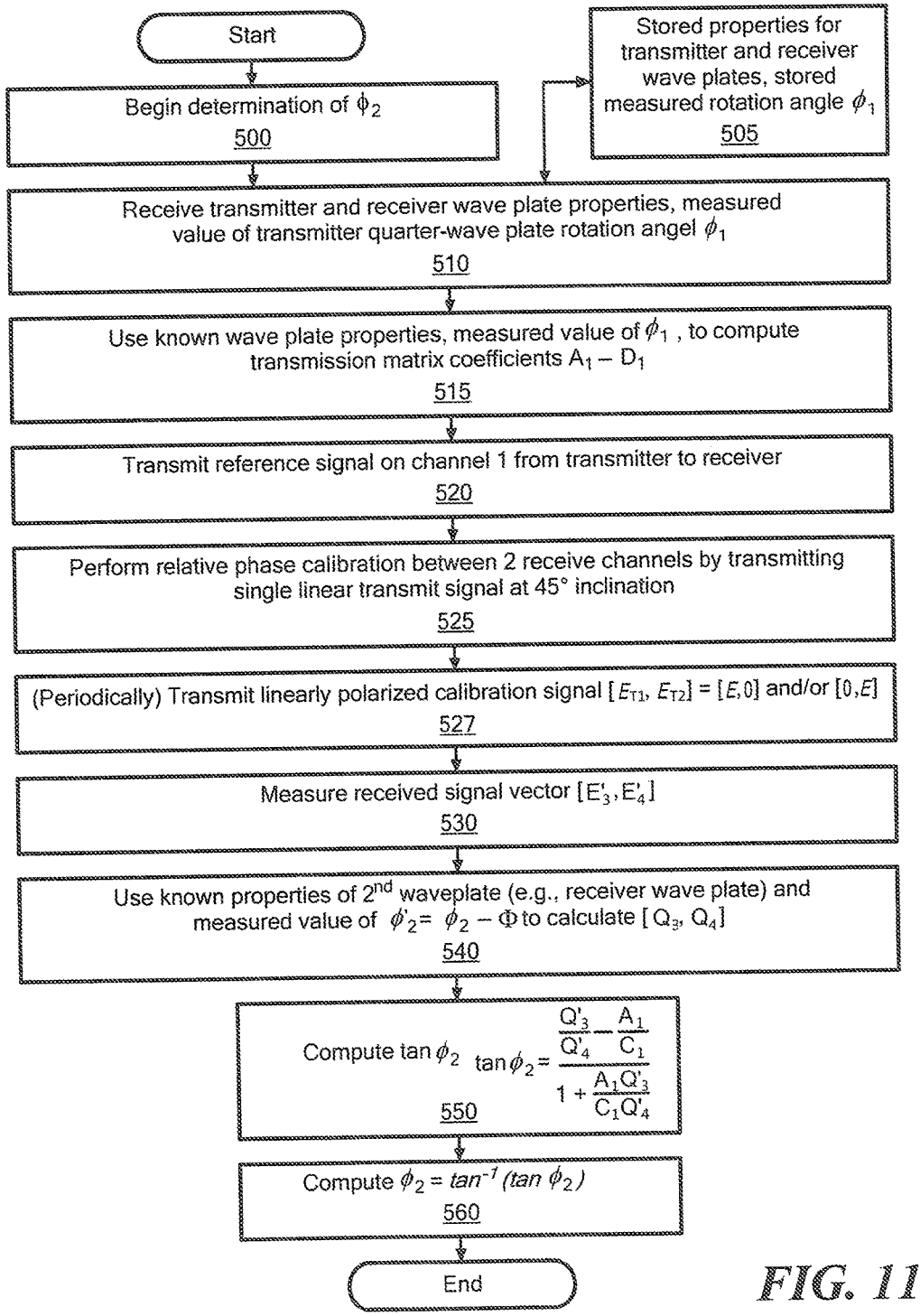
FIG. 11 is an illustrative flow chart of an exemplary method, usable with the method of FIG. 10, for computing receiver quarter-wave plate rotation angle ϕz with respect to transmitter polarization axes, in accordance with one embodiment.
Figure 12:
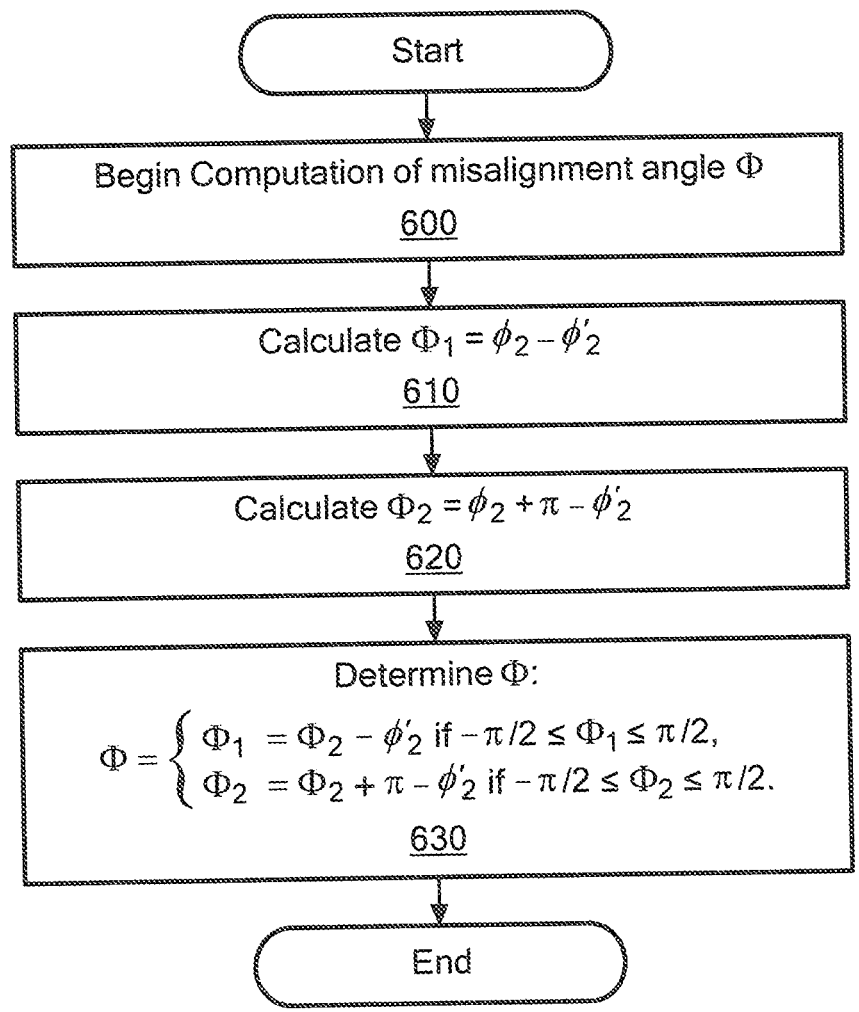
FIG. 12 is a flow chart of an exemplary method, usable with the method of FIG. 10, for computing misalignment angle Φ, in accordance with one embodiment.

FIG. 1A is a first illustrative system block diagram depicting a first half of a millimeter-wave based communications system 10A, usable at least with the communications link of FIG. 2, the methods of FIGS. 10-12, and the computer system of FIG. 1C4, configured to dynamically control the operating point to reduce cross channel interference, in accordance with one embodiment FIG. 1B is a second illustrative system block diagram depicting a second half of the millimeter-wave based communications system 10A of FIG. 1A, usable at least with the communications link of FIG. 2, the methods of FIGS. 10-12, and the computer system of FIG. 1C4, configured to dynamically control the operating point to reduce cross channel interference, in accordance with one embodiment;

In the embodiments of FIGS. 1A and 1B, the combined system is a millimeter wave communication system, which general operates at far lower frequency (and therefore far longer wavelengths) than an optical communication system. As is understood, visible light is not suitable for long-range free-space communication because visible light is strongly scattered by the dust, fog, and rain due to its short wavelength. Millimeter-wave are far less susceptible to scattering. Millimeter waves usable for such systems can, for example, be generated using solid-state transistor-based electronics, such as the mmW source of FIG. 1C. It is sufficient to replace "laser" with "mmW Source" (where mmW=Millimeter Wave). If the system of FIG. 1C used laser based sources in place of the mmW source, it may be adaptable to be used with visible light.

FIG. 1C illustrates an exemplary system 10B in which at least one disclosed embodiment is implemented. It will be appreciated that the systems 10A and/or 10B each provide a simplified representation of a system 10B in which the disclosed communications link 100 (see FIG. 2, described further herein) can operate, and that various electronics subsystems and other components (e.g., amplifiers, local oscillators mixers, power supplies, feed horns) that are known and understood by those in the art, are (for simplification) not depicted in FIG. 1C or elsewhere herein. In addition, the systems 10A, 10B of FIGS. 1A-1C are each in block diagram form and each does not illustrate direction or orientation of the signals being transmitted (although direction and orientation information is provided in other figures herein).

Referring to FIG. 1C (where elements with names similar to those of FIGS. 10A-10B have similar functions), the system 10B includes first and second communications link platforms, 101A, 101B, which include respective communication nodes 48A, 48B, respectively, that communicate over free space 103. In at least one embodiment, one or both of the communications link platforms 101A, 101B, are in motion, but this is not required for any embodiments. Advantageously, however, at least one embodiment is implemented where at least one of the communications link platforms 101A, 101B is in motion relative to the other, such as an aircraft in motion.

The first communications link platform 101A includes a first polarizer 102 configured as part of a transmitter 106. A controller/processor 50A (described further herein in connection with FIG. 1C4) is in operable communication with the transmitter 106 and is configured to transmits input data 114A from the communication node 48A to a signal source 112 (which can be any type of signal generator, as will be understood, especially, in one embodiment, a millimeter wave (mmW) source), and controls the light/signal source to emit the first and second light/signal sources outputs 113A, 113B. The controller/processor 50A also is in communication with a first data source 62A of stored information relating to the transmitter wave plate 102 and the transmitter 106; this first data source 62A need not be part of the first communications link 10A. It also will be appreciated that the input data 114A, although shown as originating from the communication node 48A, also could instead originate from the controller/processor 50A, or from another client or server outside of the system 10, or from any device or entity capable of providing input data (including a user at a terminal or other device capable of transmitting input data 114A).

Referring briefly to FIGS. 1A-1B and the system 10A, during operation, the system 10A starts with two independent data streams. Each is impressed onto a millimeter-wave (mmW) carrier to produce two independent linearly-polarized signals with orthogonal polarizations. The two orthogonally-polarized mmW signals are combined into a single physical channel by an orthomode transducer. By single physical channel it is meant, in one aspect, to be occupying the same space, for example the two orthogonal linearly polarized signals propagate in a single circular waveguide, for example. The combined signals then enter a horn antenna equipped with a rotatable quarter-wave plate (or polarizer), which converts the orthogonal linearly-polarized signals to orthogonal circularly polarized signals. The output of the horn antenna illuminates a high-gain reflector antenna, which transmits the circularly-polarized signals to the receiver.

Referring again to FIG. 1C, similarly, at the second communications link 101B, the second communication node 48B receives the transmitted, converted data 132. The second controller/processor 50B also is in communication with a second data source 62B of stored information relating to the receiver wave plate 104 and the receiver 108; this second data source 62B need not be part of the second communications link 101B, but rather can be in operable communications with the second communications link 101B. The received transmitted, converted data 132 can, in one embodiment, be received at the controller/processor 50B.

Figure 4B:
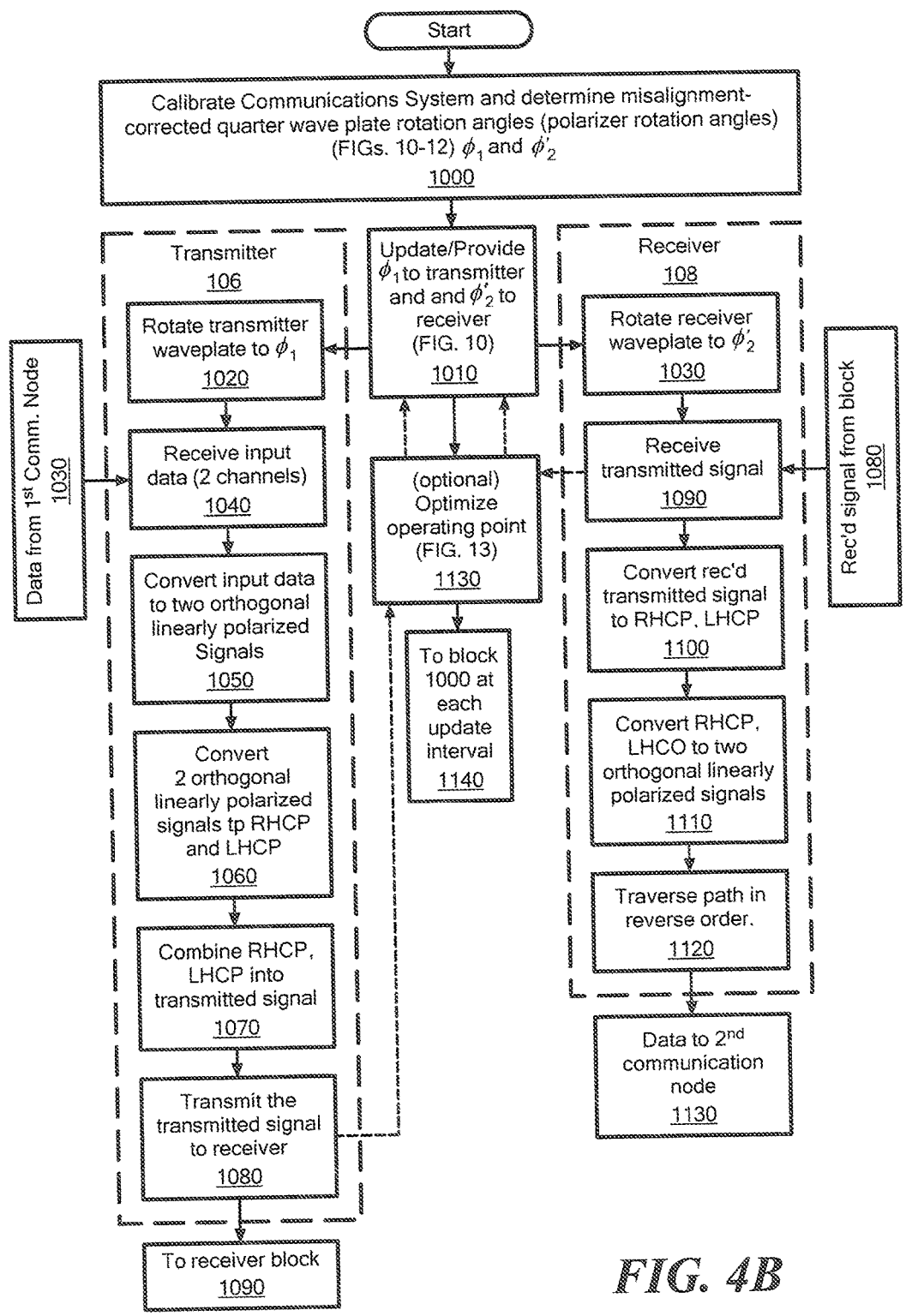
FIG. 4B is a high level flow chart showing operation of the system of FIGS. 1 and 2, in accordance with one embodiment.

FIG. 4B is a high level flow chart showing operation of the system of FIGS. 1 and 2, in accordance with one embodiment. FIG. 4B refers, in certain blocks, to processes discussed further in later figures in this application. Referring to FIGS. 1, 2, and, 4B, during operation, in the transmitter 106, two independent data streams, from the first communication node 48A (block 1030), are provided to a signal source 112 (block 1040) to be converted to first and second signal source outputs 113A, 113B that are received at a linear polarizer 110.

In one aspect, for the signal source 112, there are actually two "sources" used to convert each of the independent data streams into a modulated mmW signal. Each source comprises a modulator, which impresses the data stream onto a mmW carrier at a low power level, followed by a power amplifier which amplifies the modulated signal to a high power level for transmission through free space.

In at least some embodiments (e.g., those of FIGS. 1A-1C), a separate linear polarizer is not required. The modulated mmW signal is by its nature linearly polarized before and after amplification to high power levels. Each modulated mmW signal is launched into rectangular waveguide, which preserves the linear polarization prior to combining the two signals at the orthomode transducer.

The linear polarizer 110 converts the first and second signal outputs 113A, 113B, to two linearly polarized signals 11A8A, 118B (block 1050), which are transmitted through the linear polarizer 110 and then are provided to the polarizer 102 in the transmitter 106. The quarter wave plate/polarizer 102 converts the two linearly polarized signals 118A, 118B, to respective right and left hand circularly polarized signals RHCP 122A, LHCP 122B (block 1060). That is, the quarter wave plate/polarizer 102 is a device that can convert linear polarization to circular polarization. Although such a device might take many forms, in at least one embodiment such a device is referred to as a quarter-wave plate. The RHCP 122A and LHCP 122B signals are combined (e.g., at the orthomode transducer 123A, or another signal combiner) (block 1070) and transmitted across free space 103 (block 1080) to the corresponding orthomode transducer 123B at the receiver 108 (block 1090) at the second communications link platform 101B. The corrugated feed horn described herein is near the end of the signal path, where, together with the quarter-wave plate, it generates orthogonal circularly polarized signals that illuminate a high-gain reflector antenna that transmits the two signals to the receive. r (This communication of signals also is described further in connection with FIG. 2).

Referring again to FIGS. 1, 2 and 4B, the transmitted signal 125 is received at the second orthomode transducer 123B (block 1090), which is used to separate the polarized signals. The second orthomode transducer 12B thus converts the incoming transmitted signal 125 into a pair of received circularly polarized signals 122A' and 122B' (block 1100), which are provided to the receiver 108 polarizer 104 (or, in some embodiments, quarter wave plate), which itself converts the received circularly polarized signals 122A' and 122B' into a respective pair of linearly polarized output signals 124A, 124B (block 1110). The linearly polarized output signals 124A, 124B are received at the analyzer 125 and detector 130 and the data traverses the same path as the transmit path, except it is traversed in reverse order (block 1120), and this received data is provided, in one embodiment, to the $2^{nd}$ communication node 48B (block 1130) or another data recipient (e.g., the controller/processor S0B, or any other entity capable of receiving the data stream)). Although FIG. 1C illustrates that the received data 132 is provided to the second controller/processor S0B, that is merely illustrative and not limiting. The received data 132 could, for example, be provided to a different controller/processor 50 outside the system 10, or to a memory device (not shown), or provided to a user via audio output, user display, or any other system or device, etc., as will be appreciated.

Each communications link platform 101A, 101B also has a respective positioning encoder 120A, 120B, which is controlled, in this exemplary embodiment, by the respective controller/processor 50A, 50B. The positioning encoders 120A, 12B (120B?) are in operable communication with the respective polarizers (or wave plates) 102, 104 and used to rotate/adjust the respective polarizers (or quarter wave plates) 102, 104 (blocks 1020 and 1030 of FIG. 4B). In at least some embodiments, other positioning devices may be used to control the positioning encoder 120A, and that use of the controller/processors 50A, 50B respectively is illustrative and not limiting. In one embodiment, a motor (not shown) with an encoder is used to control angular orientation of the polarizer. Further, in at least some embodiments, other devices may be used to rotate/adjust the respective polarizers/quarter wave plates 102, 104, instead of or in addition to the positioning encoders 120A, 120B. In addition, each communications link platform 101A, 101B, has a respective angle measurement system 116A, 116B usable to measure quantities such as the rotation angle of the respective polarizer 102, 104 (or quarter wave plates), and the received signal vectors, as is explained further herein. The aforementioned encoder, in one embodiment, measures the rotation angle of the polarizer.

In FIG. 4B, block 1000 describes a high level step of calibrating the communications system and determining the misalignment-corrected polarizer rotation angles $\phi_1$ and $\phi'_2$, which angles are provided to the transmitter and receiver in block 1010. These processes are described further herein in connection with FIGS. 10-12. In addition, an optional block 1130 includes a process to optimize the operating point of the communication system 100, especially if the channel-to-channel isolation is insufficient; this process is explained more fully in connection with FIG. 13. Advantageously, in one embodiment, blocks 100 and 1010 (and, optionally, block 1130) are repeated at each update interval. This is explained further herein.

FIG. 2 illustrates in greater detail an exemplary point-to-point communications link 100 utilizing the first and second polarizers 102, 104, respectively, at both transmitter 106 and receiver 108, in accordance with one embodiment. This communications link 100 can, for example, be implemented as part of the systems 10A, 10B of FIGS. 1A-1C, as will be appreciated, but is not so limited. The first and second polarizers 102, 104 also can be used to help model actual systems (e.g., based on systems 10A, 10B of FIGS. 1A-1C) that include a corrugated horn and polarizer combination (e.g., a horn antenna and reflector, etc., as will be understood in the art). As noted above in connection with FIGS. 1A-C, the first polarizer 102 and the transmitter 106 convert two linearly polarized input signals 118A, 118B to right hand circularly polarized (RHCP) (clockwise) and left hand circularly polarized (LHCP) (counter-clockwise) signals 122A, 122B, respectively. For simplicity, however, FIG. 2 depicts only the transmitted signal 125 of FIGS. 1A-1C, as transmitted through free space. The polarizer 104 at the receiver 108 converts incident RHCP and LHCP signals 122A' and 1221' back into two orthogonal linear polarization signals 124A, 124B, respectively (see FIGS. 1A-1C).

Polarization diversity can be exploited to double the information-carrying capacity of a point-to-point communications link 100, like that depicted in FIGS. 1 and 2. In mobile communication applications, angular alignment between the transmitter 106 and receiver 108 cannot be assumed, limiting the usefulness of linear polarization. If the transmitted signals are circularly polarized, however, they can be recovered by the receiver 108 regardless of the orientation angle $\Phi$ of the receiver 108 with respect to the transmitter 106.

Figure 3:
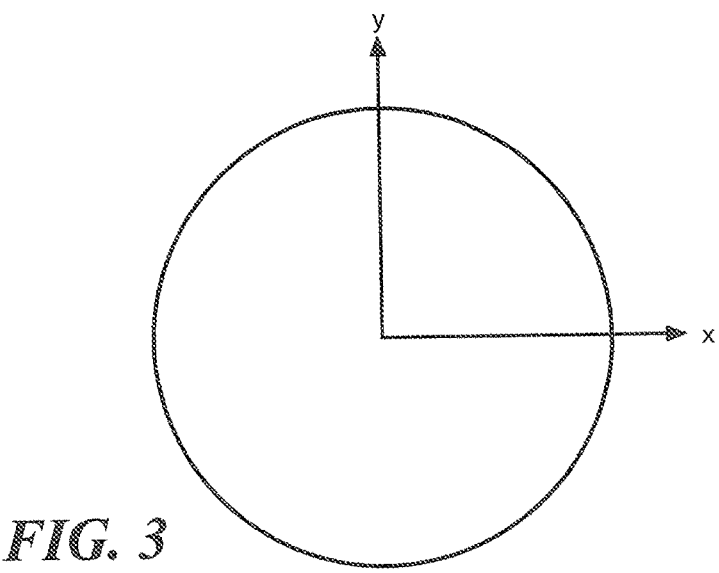
FIG. 3 depicts an exemplary quarter-wave plate with axes along x and y directions, in accordance with one embodiment.

In one embodiment, signal transmission and recovery requires two polarizers in the form of quarter-wave plates 102, 104 one at the transmitter 106, and one at the receiver 108. Referring briefly to FIG. 3, FIG. 3 depicts an exemplary quarter-wave plate with axes along x and y directions, in accordance with one embodiment. Referring to FIGS. 1A-3, if, in one embodiment, the quarter-wave plates 102, 104 are "ideal", which is defined in this embodiment as meaning no loss and a 90° relative phase shift between incident fields linearly polarized along the axes of the quarter-wave plate, then signal recovery is straightforward: the quarter-wave plate rotation angles $\phi_1$ and $\phi'_2 = \phi_2 - \Phi$ are each set to odd multiples of 45°, such that the difference between the two angles ($\phi_1$ and $\phi'_2$) is an odd multiple of 90°. For example, if $\Phi=30°$, one could have $\phi_1=45°$ and $\phi'_2=135°$. Under such ideal conditions, angles $\phi_1$ and $\phi'_2$ are independent of the value of $\Phi$, and need not be adjusted to compensate for changes in $\Phi$ with time due to variations in the relative orientation of the receiver with respect to the transmitter (due to platform motion, for example).

Unfortunately, in other embodiments, real quarter-wave plates are not ideal. Attenuation is non-zero and depends on polarization, the relative phase shift is not 90°, and both attenuation and phase shift are frequency dependent. In addition, for real quarter wave plates, in at least one embodiment, the isolation also is not perfect. Note that isolation for a real quarter-wave plate depends at least in part on quarter-wave plate departure from ideal and on relative orientation between transmitter and receiver.

Thus, in accordance with at least one disclosed embodiment, one or more methods are provided that provide ways to compensate, at least partially, for the non-ideal behavior of real-world quarter-wave plates and linear-to-circular polarizers in general, allowing for their use in various systems, including but not limited to wideband millimeter-wave communication systems that utilize polarization diversity to realize increased data rates.

As shown in FIGS. 2-4, and as understood in the art, a wave plate has a pair of orthogonal axes (e.g., the x and y axes shown in FIG. 3) having characteristic complex transmission coefficients for linearly polarized incident waves;

$$E_x^{out} = T_x e^{-j\theta_x} E_x^{in}, \qquad (1a)$$

$$E_y^{out} = T_y e^{-j\theta_y} E_y^{in}, \qquad (1b)$$

where $T_x$ and $T_y$ are the real transmission coefficients (accounting for reflection and ohmic losses) and $\theta_x$ and $\theta_y$ are the corresponding phase shifts. In general, wave plates will have different transmission amplitudes and phases along the two axes x, y, as shown in Equations (1a) and (1b) above.

FIGS. 1 and 2, as noted above, depict embodiments of an exemplary free-space communication link 100. The transmitter 106 generates two orthogonal linearly-polarized information-bearing signals 118A, 118B. The electric-field vectors of the two signals are aligned with the transmitter 106 polarization axes (designated "1" and "2" in FIG. 2). That is, the first signal 118A of the two orthogonal linearly-polarized information bearing signals is polarized along axis 1 and the second signal 118B is polarized along axis 2. The two signals 118A, 118B are combined into a transmitted signal 125 (e.g., at the first orthomode transducer 123A (orthomode transducers also are known as a polarization duplexers)), and transmitted across free space 103 to the receiver 108. There also is a step of conversion to circular polarization, as described herein.

FIG. 2 depicts two sets of polarization axes at the receiver: axes 3 and 4. Axes 3 and 4 are aligned with transmitter 106 axes 1 and 2, respectively. FIG. 2 also shows axes 3' and 4', which are rotated by an angle $\Phi$ with respect to receiver axes 3 and 4. The angle $\Phi$ (also referred to as misalignment angle) is used to quantify any angular misalignment between transmitter and receiver (thus, the smaller the angle $\Phi$, the better the alignment between transmitter 106 and receiver 108). In at least one embodiment, this misalignment angle is estimated, based at least in part on measured/stored polarizer 102, 104 performance parameters and actual measured transmitter 106 and receiver 108 polarizer 102, 104 rotation angles (this is discussed further herein in connection with FIG. 1C0). The transmitted signals are circularly polarized, having been converted from linear to circular polarization by the transmitter's polarizer/quarter-wave plate. In another embodiment, the two orthogonal linearly-polarized information bearing signals 118A, 118B, sent together as a transmitted signal 125, must be separated by the receiver 108 (e.g., via the $2^{nd}$ orthomode transducer 123B) with minimal cross-channel interference. FIG. 3 provides another illustration showing, in one figure, transmitter 106 polarization axes 1 and 2 and receiver 108 polarization axes 3' and 4'.

In the illustrative examples of FIGS. 1-4, the communications link 100, in one embodiment, is implemented using non-ideal, but identical quarter wave plates 102, 104 at the transmitter 106 and receiver 108, respectively. In one embodiment, the real-time transmission coefficient T for the wave plates 102, 104 also might not be identical in both the x and y direction and also can deviate from the "ideal" value of 1 (which would mean 100% of light is transmitted). In this example $T_x \neq T_y$, $T_x$, $T_y < 1$. For example, in one embodiment, $T_x = 0.97$ and $T_y = 0.98$, and the differential phase shift $\theta_x - \theta_y = 85°$, and the transmitter-receiver misalignment angle $\Phi = 30°$.

Circular polarization can be utilized to mitigate the effects of angular misalignment between the receiver 108 and the transmitter 106. For example, referring to FIGS. 1-4, the first linearly polarized input signal 118A ("signal 1") (polarization 1) is converted to right-hand circular polarization (RHCP) 122A and the second linearly polarized input signal 118B ("signal 2") (polarization 2) is converted to left-hand circular polarization 122B, prior to transmission. With an ideal quarter-wave plate 104 at the receiver 108, the receiver 108 can distinguish RHCP from LHCP regardless of the relative rotation angle $\Phi$ between transmitter 106 and receiver 108 polarization axes.

To implement such an example system/embodiment 100 as shown in FIG. 2, two quarter-wave plates 102, 104 are required. A first polarizer 102 is needed at the transmitter 106 to convert linear to circular polarization prior to transmission. A second quarter-wave plate 104 is needed at the receiver 108 to convert the transmitted right- and left-hand circularly polarized signals 122A', 122B', back to their corresponding linear polarizations 124A, 124B. As shown in FIG. 2, the transmitter wave plate 102 is oriented at an angle $\phi_1$ with respect to the transmitter polarization axes x and y. The transmitter wave plate 102 takes the two orthogonal linearly-polarized input signals 118A, 118B and converts the first linearly polarized input signal 118A to right-hand circular polarization (RHCP) 122A and the second linearly polarized input signal 118B to left-hand circular polarization (LHCP) 122B, for transmission to the receiver 106. At the receiver 108, the second wave plate 104 is oriented at an angle $\phi'_2 = \phi_2 - \Phi$ with respect to the receiver 108 polarization axes x' and y'. The second wave plate 104 converts the incident circularly-polarized waves 122A', 122B', back to two orthogonal linearly polarized signals 124A, 124B. Note that the linearly-polarized signal components at the receiver 104 need not be parallel to their transmitted counterparts. For interference-free reception, in one embodiment, the linearly-polarized signal components at the receiver 102 need to be parallel to the rotated receiver polarization axes 3' and 4'.

The effect of a single wave plate on an input signal with linearly-polarized components $E_1$ and $E_2$ along axes 1 and 2, respectively, is described by a 2×2 matrix equation (2):

$$\begin{bmatrix} E_1^{out} \\ E_2^{out} \end{bmatrix} = \begin{bmatrix} A_1 & B_1 \\ C_1 & D_1 \end{bmatrix} \begin{bmatrix} E_1^{in} \\ E_2^{in} \end{bmatrix} \qquad (2)$$

where

-continued $$A_1 = T_x e^{-j\theta_x}\cos^2\phi_1 + T_y e^{-j\theta_y}\sin^2\phi_1 \quad (3a)$$

$$B_1 = (T_x e^{-j\theta_x} - T_y e^{-j\theta_y})\sin\phi_1\cos\phi_1 \quad (3b)$$

$$C_1 = (T_x e^{-j\theta_x} - T_y e^{-j\theta_y})\sin\phi_1\cos\phi_1 \quad (3c)$$

$$D_1 = T_x e^{-j\theta_x}\sin^2\phi_1 + T_y e^{-j\theta_y}\cos^2\phi_1 \quad (3d)$$

Here, x and y refer to the axes of the wave plate, and the angle $\phi_1$ is the rotation angle of the x-axis of the wave plate with respect to polarization axis 1 of the transmitter 102.

An ideal quarter-wave plate has $T_x=T_y=1$ and $\theta_x-\theta_y=\pm 90°$. Assuming $\theta_x-\theta_y=90°$ and an angle $\phi_1=45°$, the output wave in vector form for an ideal quarter-wave plate is:

$$\vec{E}_{out} = e^{-j\theta_x}(E_1^{in}\hat{e}_{RHCP} + E_2^{in}\hat{e}_{LHCP}),$$

where $\hat{e}_{RHCP}$ and $\hat{e}_{LHCP}$ are complex unit vectors for right- and left-hand circularly-polarized waves, respectively, $$\hat{e}_{RHCP} = \frac{\hat{e}_x - j\hat{e}_y}{\sqrt{2}}, \quad \hat{e}_{LHCP} = \frac{\hat{e}_x + j\hat{e}_y}{\sqrt{2}},$$

and $\hat{e}_x$ and $\hat{e}_y$ are unit vectors along the x- and y-axes of the quarter-wave plate, respectively. That is, an ideal quarter-wave plate converts the signal whose electric field vector is parallel to polarization axis 1 into RHCP, and the signal whose electric field vector is parallel to polarization axis 2 into LHCP. In the ideal case, there is no interference between the two signals in that the amplitude of the RHCP component is due entirely to signal 1 and the LHCP component is due entirely to signal 2.

The effect of two quarter-wave plates (similar to quarter-wave plates 102 and 104 in FIG. 2) with rotation angles $\phi_1$ and $\phi_2$ with respect to the transmitter polarization axes 1 and 2 is described by the product of corresponding 2×2 matrices. Also needed at the receiver 108 is a simple 2×2 rotation matrix to account for any rotation of the receiver 108 with respect to the transmitter 106. The rotation matrix generates the polarization components of the received wave along the receiver 108 axes 3' and 4', which are rotated by an angle $\Phi$ with respect to those of the transmitter 106;

$$\begin{bmatrix} E'_3 \\ E'_4 \end{bmatrix} = \begin{bmatrix} \cos\Phi & \sin\Phi \\ -\sin\Phi & \cos\Phi \end{bmatrix} \begin{bmatrix} A_2 & B_2 \\ C_2 & D_2 \end{bmatrix} \begin{bmatrix} A_1 & B_1 \\ C_1 & D_1 \end{bmatrix} \quad (4)$$

$$\begin{bmatrix} E_1 \\ E_2 \end{bmatrix} = \begin{bmatrix} A_T & B_T \\ C_T & D_T \end{bmatrix} \begin{bmatrix} E_1 \\ E_2 \end{bmatrix}.$$

The matrix elements $A_2$-$D_2$ are identical in form to $A_1$-$D_1$ in Equations (3a-3d), but with $\phi_2$ in place of $\phi_1$.

If both quarter-wave plates 102, 104 are ideal, and if the receiver 108 polarization axes are rotated by an angle $\Phi$ with respect to those of the transmitter 106, then the received signal components are related to the transmitted components by:

$$\begin{bmatrix} E'_3 \\ E'_4 \end{bmatrix} = e^{j\alpha}\begin{bmatrix} 1 & 0 \\ 0 & 1 \end{bmatrix}\begin{bmatrix} E_1 \\ E_2 \end{bmatrix}$$

when the quarter-wave plate rotation angles are:

$$\phi_{1,ideal} = [2(n+m)+1]\frac{\pi}{4}, \quad (5a)$$

$$\phi'_{2,ideal} = \phi_{2,ideal} - \Phi = [2(n-m)-1]\frac{\pi}{4}, \quad (5b)$$

where m and n are integers. To recover the original linearly polarized channels at the receiver, it is necessary for $B_T=C_T=0$ in Equation 4. Both $B_T$ and $C_T$ depend on trigonometric functions of the angles $\phi_1$ and $\phi_2$. In setting $B_T=0$, there are multiple solutions for the angles $\phi_1$ and $\phi_2$ due to the periodic nature of the trigonometric functions. The integers n and m quantify this underlying periodicity, as will be appreciated.

The phase shift $\alpha$ is:

$$\alpha = \frac{\pi}{2} - 2\theta_x + (-1)^{m+n+1}\Phi \quad (5c)$$

Referring again to FIG. 2 and to equations (1)-(5c), here, $\phi'_2=\phi_2-\Phi$ is the rotation angle of the receiver 108 wave plate 104 with respect to the rotated receiver polarization axis 3'. While the angle $\phi'_2$ can be directly measured (as the output of the receiver quarter-wave plate 104 positioning motor encoder, for example), either $\phi_2$ nor $\Phi$ can be measured directly and must be inferred from other measurements. Note that $\phi_1$ and $\phi'_2$ are odd multiples of $\pi/4$ and that the difference between the two angles satisfies the equation:

$$\phi_1 - \phi'_2 = (2m+1)\frac{\pi}{2} \quad (5d)$$

That is, the difference between the two orientation angles $\phi_1$ and $\phi'_2$ generally will be an odd multiple of 90°. Under the ideal conditions described here, in connection with one embodiment, the transmitted signals 1 and 2 (polarized parallel to transmitter polarization axes 1 and 2, respectively), corresponding to linearly polarized inputs 118A, 118B in FIG. 1C, are recovered at the receiver 108 even if the receiver 108 polarization axes are not parallel to those of the transmitter 106. No knowledge of the receiver 108 orientation relative to the transmitter 106 is needed, which is a motivation for using circular polarization.

As already explained above, real quarter-wave plates are not ideal, such that $T_x \neq T_y \neq 1$, and $|\theta_x-\theta_y|\neq 90°$. As a result, the transmitted electromagnetic waves are in general slightly elliptical in polarization, and channel isolation at the receiver 108 is degraded. To illustrate this point, consider an example. Assume (e.g., for equations (5a)-(5d) above) that m=1, n=−1, and $\Phi=30°$, in which case the rotation angles for an ideal quarter-wave plate are $\phi_1=45°$ and $\phi'_2=135°$ ($\phi_2=165°$).

Figure 5A:
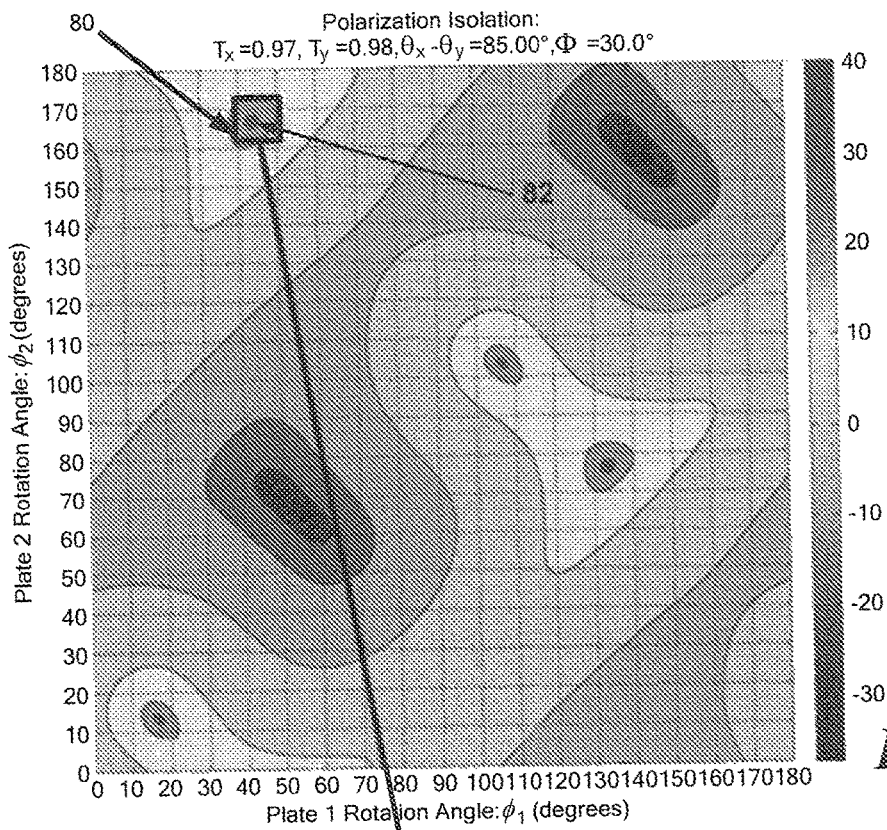
FIGS. 5A-5B provides an exemplary contour plot of two-channel isolation as a function of the transmitter and receiver quarter-wave plate rotation angles as referenced to the transmitter, where
Figure 5B:
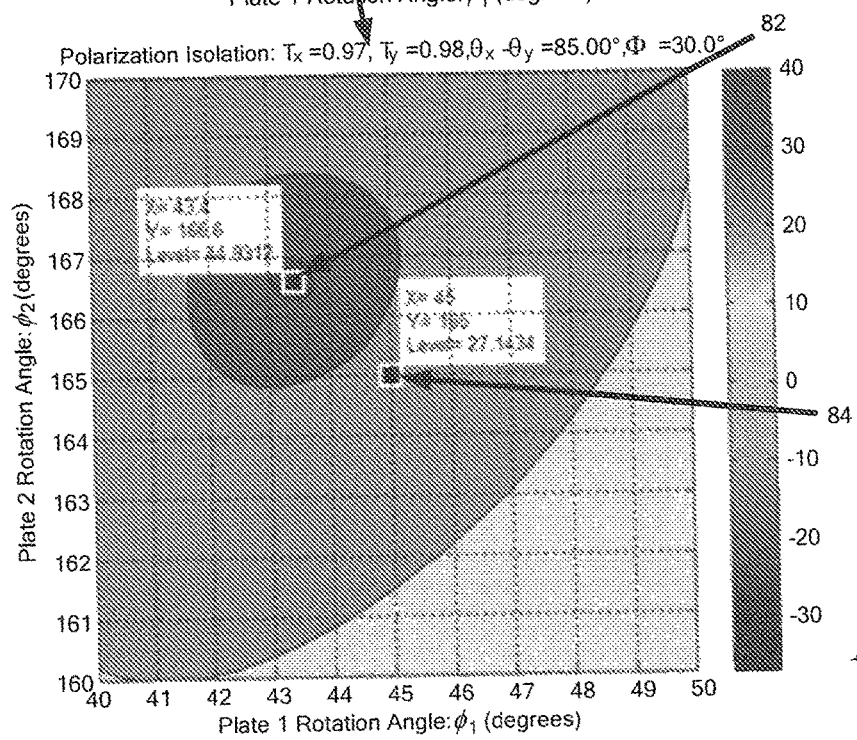

Reference is now made to FIGS. 5A-5B, which provide an exemplary contour plot of two-channel isolation as a function of the transmitter and receiver quarter-wave plate rotation angles as referenced to the transmitter 106 of FIGS. 1 and 2, where FIG. 5A is a plot of the isolation over the range $0 \leq \phi_{1,2} \leq 180°$, and shows approximate location range 80 of ideal operating point 82. FIG. 5B shows more clearly the area around the ideal operating point 82 ($\phi_1,\phi_2$), in accordance with one embodiment.

FIGS. 5A and 5B show receiver channel isolation as a function of the rotation angles $\phi_1$ and $\phi_2$ when the wave plates (e.g., quarter wave plates 102 and 104 of FIG. 2) are non-ideal. In particular, the wave plates 102, 104, which are assumed to be identical for simplicity, have $T_x$=0.97, $T_y$=0.98, and $\theta_x-\theta_y$=85°. In general, receiver isolation of each channel is:

$$I = 10 \log_{10}\left(\frac{P_{copolar}}{P_{cross}}\right) \tag{6a}$$

where a single incident wave has co-polar power $P_{copolar}$ (vertically polarized) and cross-polar power $P_{cross}$ (horizontally polarized) after passage through the quarter-wave plate.

In one aspect, the process starts at the transmitter with two orthogonal linearly polarized signals bearing independent data streams. They are combined into a single beam by the orthomode transducer and converted to RHCP and LHCP (slightly elliptical in reality) by the wave plate. At the receiver, each signal has a linearly-polarized component along the desired direction and a component along the orthogonal direction after passage through the receiver wave plate. It is the component along the orthogonal direction that represents interference or crosstalk, as it is aligned with and will interfere with the other channel. These undesired interfering signal components are represented by the matrix elements $B_T$ and $C_T$ in Eq. 4.

In one embodiment, isolation in either receiver channel is defined here as the ratio of the desired channel to that of the undesired channel. This is explained further herein in connection with FIG. 1C3. For example, in terms of the transmission matrix Eq. (4), the receiver 108 isolation I for each channel 1, 2 is:

$$I_1 = 20 \log_{10}\left|\frac{A_T}{B_T}\right|, \quad I_2 = 20 \log_{10}\left|\frac{D_T}{C_T}\right|. \tag{6}$$

In FIGS. 5A and 5B, the worst-case isolation is plotted at each point (in particular, the minimum channel isolation $\min[I_1(\phi_1,\phi_2),I_2(\phi_1,\phi_2)]$ is plotted at each point $(\phi_1,\phi_2)$). For example, in FIG. 5A, the x-axis is the rotation angle $\phi_1$ of plate 1 of FIG. 2 (i.e., the polarizer 102 at transmitter 106), and the y-axis is the rotation angle $\phi_2$ of plate 2 of FIG. 2 (i.e., the quarter wave plate 104 of receiver 108). Referring still to FIG. 5A, for ideal quarter-wave plates, in one embodiment, the best isolation is expected at $\phi_1$=45°, $\phi_2$=180°+Φ−45° 165° ($\phi'_2$=135°); in reality, isolation at this point is 27.14 dB. This is shown in FIG. 5A, where the ideal operating point range 80 is highlighted via the black box in the top left corner of FIG. 5A, along with the ideal operating point 82 itself.

FIG. 5B shows the region near the ideal operating point range 80 of FIG. 5A (the above-described operating point for ideal quarter-wave plates) $(\phi_1,\phi_2)$=(45°, 165°) in greater detail, for the case of a system implemented using non-ideal quarter wave plates. The impact of the non-ideal wave plate performance is a shift in location of the region of maximum isolation from the location of the ideal operating point. In FIG. 5B, the isolation at the first ideal operating point 84 (which is within the ideal operating point range 80) is about 27.14 dB, using "real" quarter-wave plates. This isolation of 27.14 dB at the first ideal operating point 84 is insufficient, in one embodiment, for a high-speed communication link using high-order modulation techniques (e.g., 32-QAM) and requiring 30 dB or more isolation. The isolation of 44.9 dB at the optimal operating point 82 $(\phi_1,\phi_2)$=(43.4°, 166.6°) (where $\phi'_2$=136.6°) is more than sufficient, however. High-order modulation schemes such as QAM-32, QAM-64, etc. pack more and more information into each transmitted symbol by sacrificing immunity to interference and noise, and sufficiency of isolation will be well understood by those in the art.

In one embodiment, the ideal operating point is given by Eqs. 5a and 5b; it is the operating point under ideal conditions when using ideal wave plates. The optimal operating point is the point of maximal isolation when real, non-ideal waveplates are used. In the example given here, the optimal operating point is found by calculating the isolation as a function of the angles $\phi_1$ and $\phi_2$ and finding the peak value. In practice, one would use approximate or iterative techniques, as described below.

In one embodiment, a significant performance benefit is gained by operating at or near the optimal operating point 82. For example, if the wave plates 102, 104 are of high quality, i.e., having low transmission losses (that is, $T_x$ and $T_y$ are reasonably close to unity) and $|\theta_x-\theta_y|$ is close to 90°, an approximate solution for the rotation angles $\phi_1$ and $\phi_2$ may be derived given only the polarization offset angle Φ and the wave plate phase shift error δ defined by $$\theta_x - \theta_y = \frac{\pi}{2} + \delta. \tag{7}$$

where $\theta_x$=phase shift in x direction and $\theta_y$=phase shift in y direction.

Given the angles Φ and δ, isolation at the receiver is maximized by diagonalizing the matrix $$M_T = \begin{bmatrix} A_T & B_T \\ C_T & D_T \end{bmatrix} \tag{8}$$

defined in Equation (4). An approximate solution is obtained by finding the angles $(\phi_1,\phi_2)$ at which the off-diagonal matrix element $B_T$ is approximately zero;

$$\phi_1 = [2(n+m)+1]\frac{\pi}{4} + \frac{\beta}{2'} \tag{9a}$$

$$\phi'_2 = [2(n-m)-1]\frac{\pi}{4} - \frac{\beta}{2'} \tag{9b}$$

where $$\beta = \frac{\sin 2\Phi \sin\delta(1+\sin\delta)}{2[(1-3\sin^2\Phi)\sin^2\delta + 2\cos 2\Phi \sin\delta + \cos^2\Phi]}. \tag{10}$$

In the current illustrative example, β=−2.97°.

Figure 6:
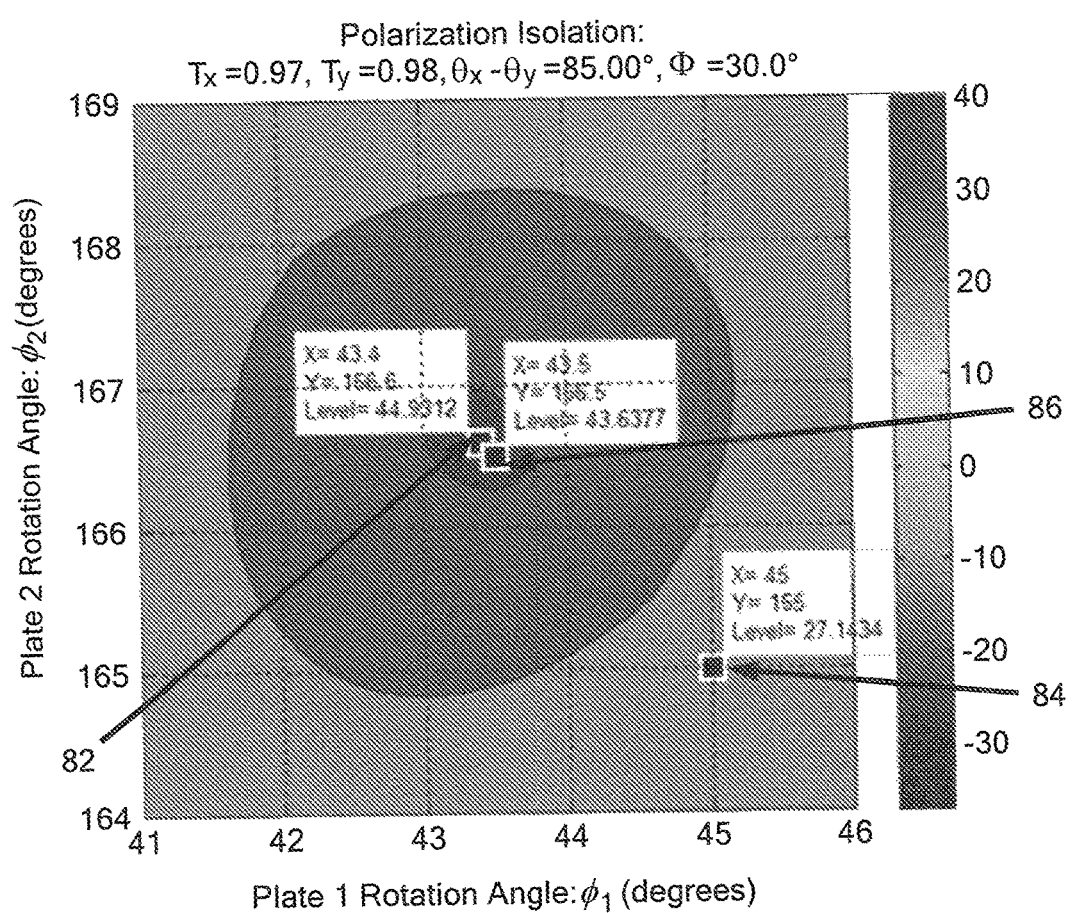
FIG. 6 provides a more detailed version of FIG. 5B showing the region near the ideal and optimal operating points in greater detail, in accordance with one embodiment.

FIG. 6 is an expanded version of FIG. 5B showing the ideal operating point 84, the optimal operating point 82, and the approximate operating point 86 at $(\phi_1,\phi_2)$=(43.5°, 166.5°). Isolation at the approximate operating point 86 is 43.6 dB, only 1.3 dB below the optimal operating point 82 and 16.5 dB greater than that at the ideal operating point 84. In one embodiment, all that is required to compute the approximate operating point 86 is the angle δ, (also referred to herein as wave plate phase shift error) which is a known property of the wave plates obtained via measurement, and the angle Φ, which must be determined periodically during operation.

FIGS. 5A-5B and 6 graphically illustrate the effectiveness, in one example embodiment, of at least one of the polarization compensation methods described herein, which methods apply at least one polarization compensation algorithm discussed herein, in accordance with one embodiment, but only for a single set of quarter-wave plate parameters, for a single value of the orientation angle Φ, and under the assumption that the non-ideal transmitter and receiver quarter-wave plates are assumed identical. In at least one real-life situation/embodiment, the differential phase shift $\theta_x - \theta_y$ may be significantly different than 90°, and the quarter-wave plates 102, 104 may be subject to finite manufacturing tolerances and may be slightly different (versus being identical to teach other).

Figure 7:
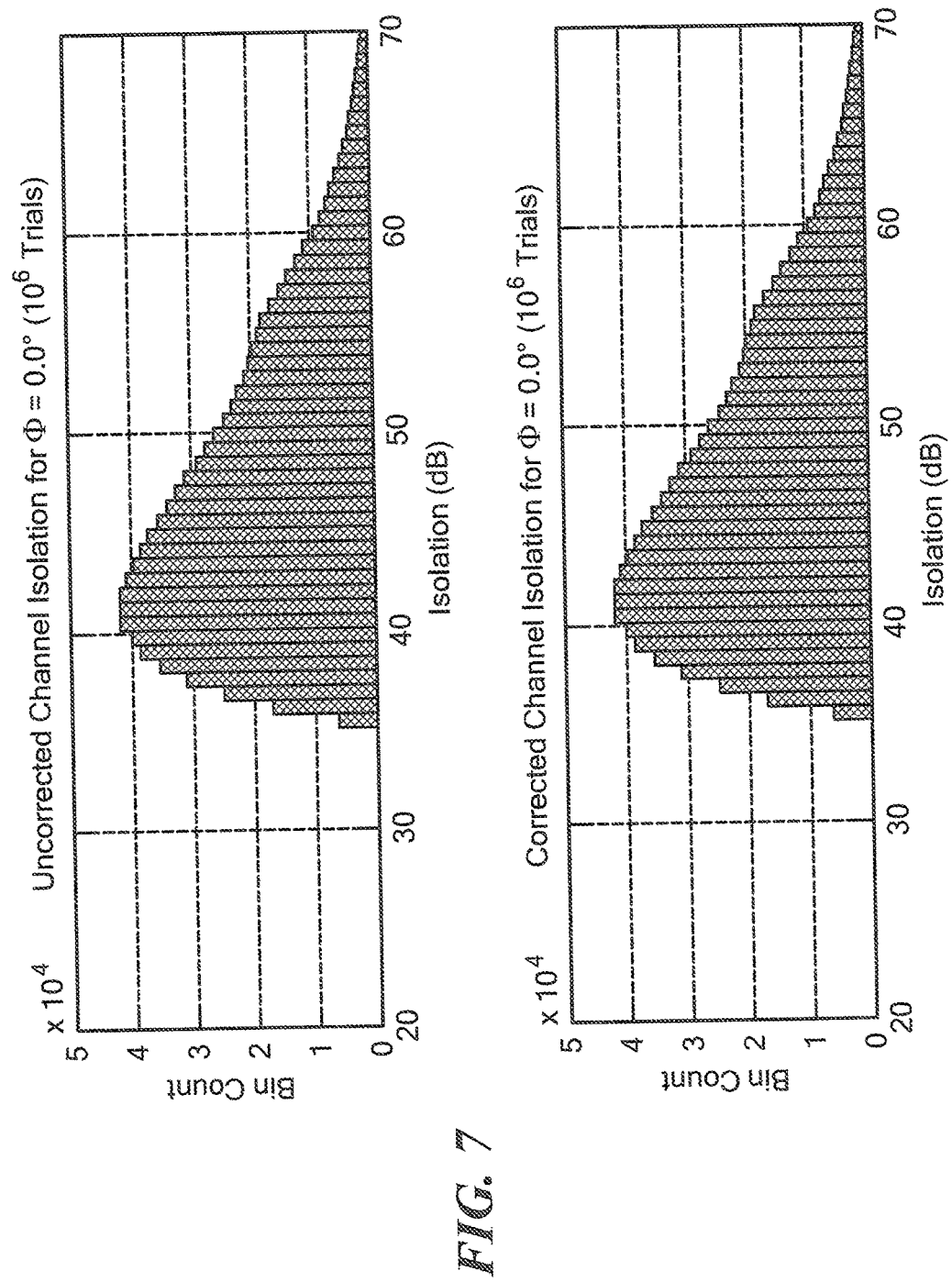
FIG. 7 shows two exemplary histograms on which are plotted the results of Monte Carlo simulations of uncorrected and corrected receiver isolation comprising $10^6$ trials for the case $\Phi=0°$, in accordance with, one embodiment.
Figure 8:
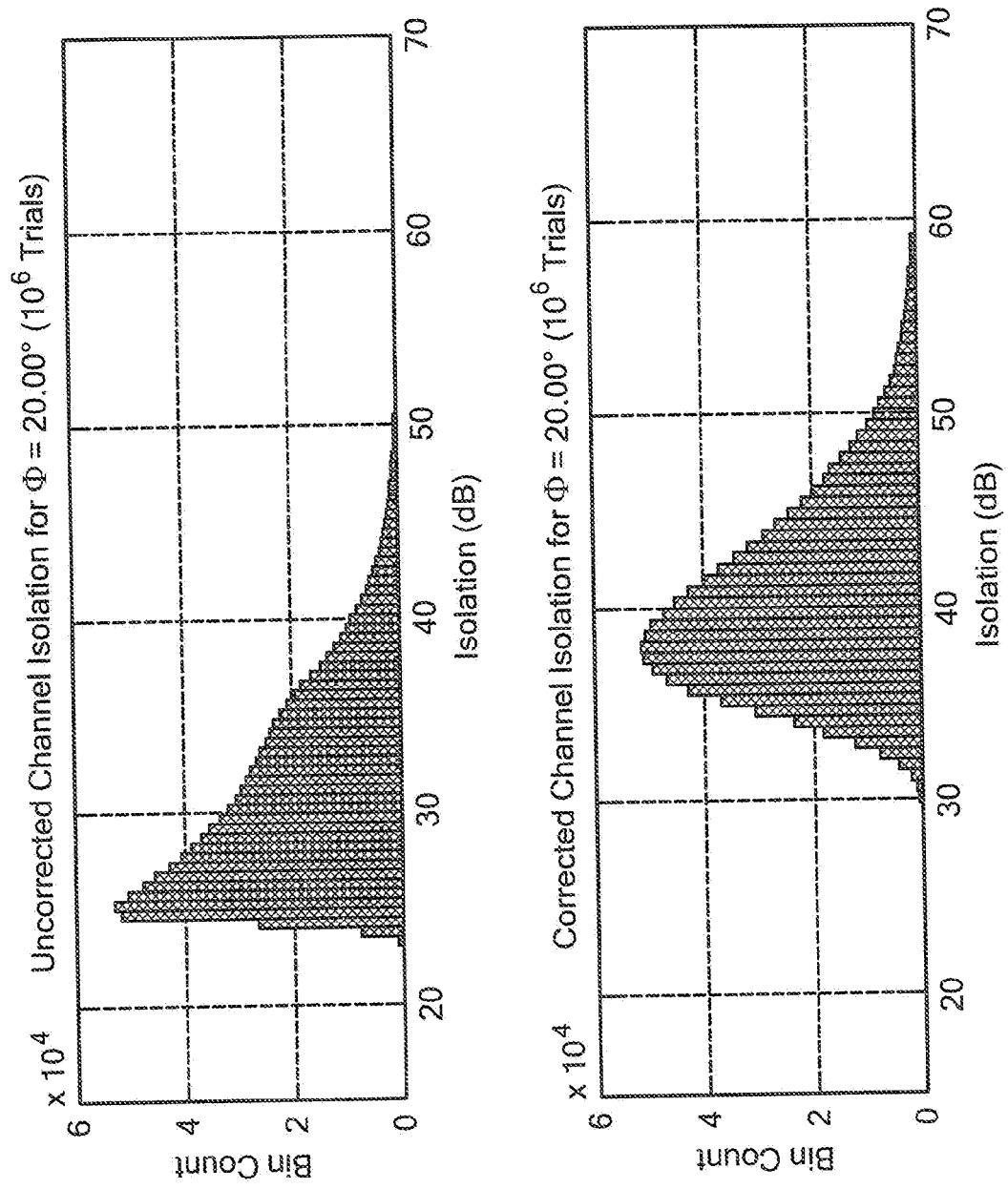
FIG. 8 shows two exemplary histograms on which are plotted the results of Monte Carlo simulations of uncorrected and corrected receiver isolation comprising $10^6$ trials for the case $\Phi=20°$, in accordance with one embodiment.
Figure 9:
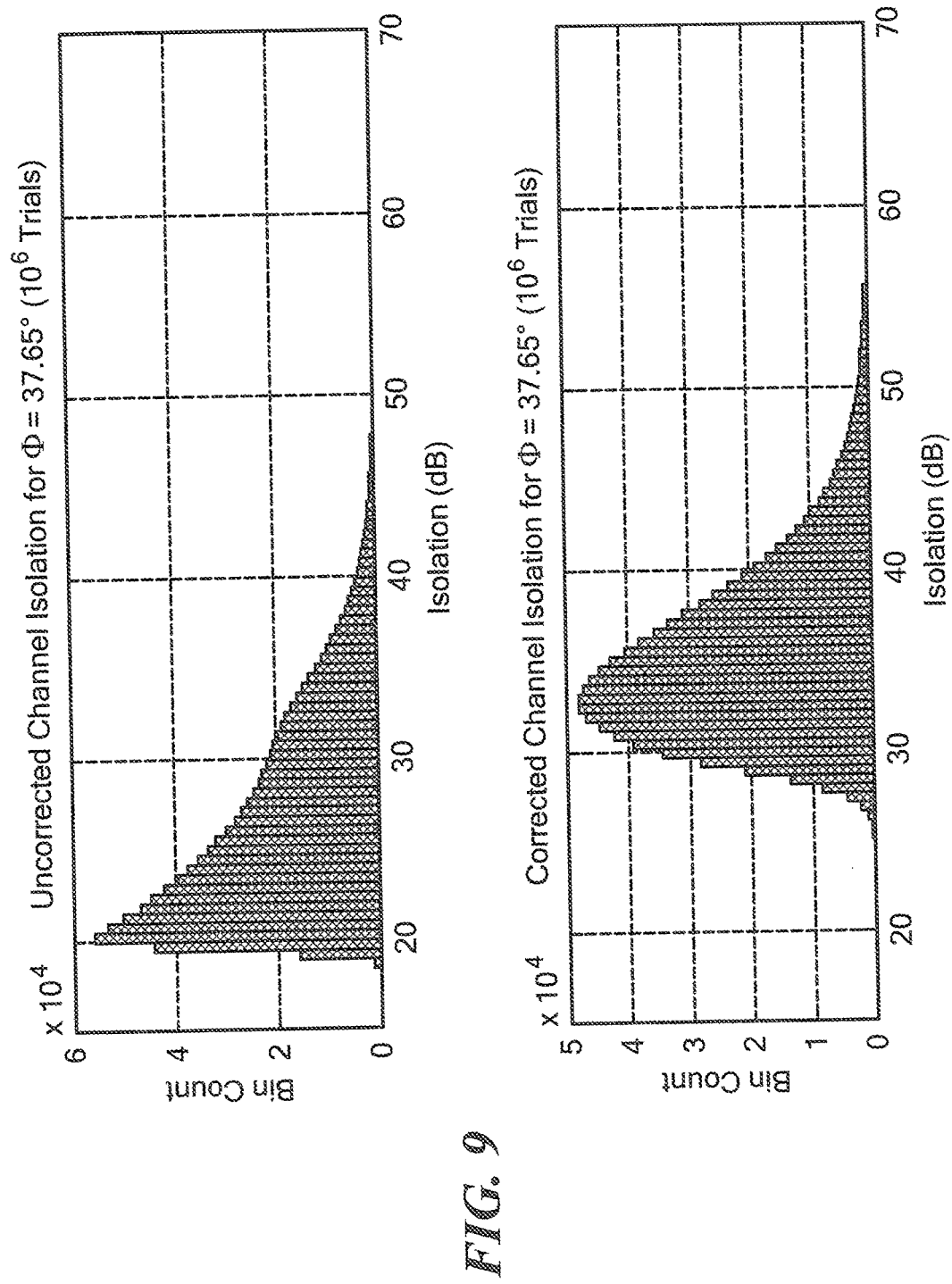
FIG. 9 shows two exemplary histograms on which are plotted the results of Monte Carlo simulations of uncorrected and corrected receiver isolation comprising $10^6$ trials for the case $\Phi=37.65°$ at which point the number of failed trials surpasses 10% (i.e., the yield of quarter-wave plate pairs falls below 90%), in accordance with one embodiment.

In one embodiment, these restrictions are relaxed in FIGS. 7-9, which present the results of a series of Monte-Carlo simulations in which the quarter-wave plate parameters were allowed to vary randomly over a large number ($10^6$) of trials. This helps, for at least some embodiments, to simulate various combinations of non-ideal wave plates.

In another embodiment, while various combinations are being simulated, the range of variation is small. The transmitter and receiver wave plates are assumed here, for at least some embodiments, to be of identical design. The random variations are "noise" due to manufacturing tolerances which result in non-identical performance for the two wave plates. If manufacturing standards are high, tolerances will be tight and performance variations small.

In particular, FIG. 7 shows two histograms on which are plotted the results of Monte Carlo simulations of uncorrected and corrected receiver isolation comprising $10^6$ trials for the case Φ=0°, in accordance with one embodiment. FIG. 8 shows two histograms on which are plotted the results of Monte Carlo simulations of uncorrected and corrected receiver isolation comprising $10^6$ trials for the case Φ=20°, in accordance with one embodiment. FIG. 9 shows two histograms on which are plotted the results of Monte Carlo simulations of uncorrected and corrected receiver isolation comprising $10^6$ trials for the case Φ=37.65° at which point the number of failed trials surpasses 10% (i.e., the yield of quarter-wave plate pairs falls below 90%), in accordance with one embodiment.

In one aspect, the variation of each parameter is represented by a uniformly distributed random variable that varies over the range specified below:

$$T_{x1}=0.95\pm0.02$$

$$T_{y1}=0.95\pm0.02$$

$$\theta_{x1}-\theta_{y1}=90°+\delta, -10°\leq\delta\leq10°$$

$$T_{x2}=T_{x1}\pm0.002$$

$$T_{y2}=T_{y2}\pm0.002$$

$$\theta_{x2}-\theta_{y2}=\theta_{x1}-\theta_{y1}\pm1°$$

Thus, each plot in FIGS. 7-9 represents a different value of the transmitter-receiver misalignment angle Φ (e.g., 0°, 20°, 37.5°), and illustrates uncorrected (left) and corrected (right) isolation. Note that these misalignment angles are illustrative and not limiting. In each case, the worst-case channel isolation is calculated at the approximate operating point ($\phi_1$, $\phi_2$') given by Equation (9); for the uncorrected isolation, the correction angle β is set equal to zero for all trials. When the transmitter and receiver are aligned (Φ=0°), the minimum isolation out of 1 million trials is 35.1 dB. FIG. 7 shows the results of all trials for Φ=0° in the form of a histogram. When Φ=0, the two sets of results (uncorrected and corrected) are identical since β=0 when Φ=0. As the misalignment angle increases, performance degrades. When Φ exceeds approximately 20° (as shown in FIG. 7), the minimum isolation falls below 30 dB. As Φ continues to increase, the minimum isolation decreases, and the percentage $P_{fail}$ of trials whose isolation falls below 30 dB increases rapidly, surpassing 10% when Φ≥37.65°. That is, the yield of quarter-wave plate pairs falls below 90% as Φ surpasses 37.65°. For example, FIG. 9 shows the corresponding histogram for this case where Φ=37.65°. The minimum isolation and the number and percentage of failed trials (trials that do not meet the 30 dB isolation requirement) and the yield are tabulated in Table 1 for uncorrected and corrected operation at angles up to 45°.

TABLE 1

| Φ | min [$I_1$, $I_2$] (dB) | | $N_{fail}$ | | $P_{fail}$ (%) | | Yield (%) | |
|---|---|---|---|---|---|---|---|---|
| | Uncorr. | Corr. | Uncorr. | Corr. | Uncorr. | Corr. | Uncorr. | Corr. |
| 0° | 35.1 | 35.1 | 0 | 0 | 0 | 0 | 100 | 100 |
| 10° | 27.7 | 32.1 | 27877 | 0 | 2.8 | 0 | 97.2 | 100 |
| 20° | 23.1 | 29.8 | 512324 | 5 | 51.2 | $5 \times 10^{-4}$ | 48.8 | 99.9995 |
| 25° | 21.4 | 28.3 | 611256 | 498 | 61.1 | 0.0498 | 38.9 | 99.95 |
| 30° | 20.0 | 27.2 | 676843 | 4488 | 67.7 | 0.45 | 32.3 | 99.6 |
| 35° | 18.8 | 25.9 | 725125 | 32250 | 72.5 | 3.2 | 27.5 | 96.8 |
| 37.65° | 18.3 | 25.1 | 743178 | 100777 | 74.3 | 10.1 | 25.7 | 89.9 |
| 40° | 17.9 | 23.9 | 758139 | 193386 | 75.8 | 19.3 | 24.2 | 80.7 |
| 45° | 17.1 | 20.2 | 785121 | 364449 | 78.5 | 36.4 | 21.5 | 63.6 |

In accordance with another aspect of the embodiments described herein, a method for determining and applying compensation for non-ideal quarter-wave plate performance and transmitter-receiver angular misalignment is provided. Note that, for some embodiments, correction is not needed for relatively small misalignment angles (e.g., misalignment angles that are 10° or smaller) and reasonable quarter wave plate performance. For larger misalignment angles (e.g., misalignment angles greater than 10°), more frequent polarizer calibration and angular correction is needed, e.g., periodic calibration/correction, for at least some embodiments.

For example, FIG. 10 is an illustrative flow chart of a method for determining at least one appropriate operating point, usable with the systems of FIGS. 1A-FIG. 1C and the communications link of FIG. 2, in accordance with one disclosed embodiment. FIG. 11 is an illustrative flow chart of a method, usable with the method of FIG. 10, for computing receiver quarter-wave plate rotation angle $\phi_2$ with respect to transmitter polarization axes, in accordance with one embodiment. Also, FIG. 12 is a flow chart of a method, usable with the method of FIG. 10, for computing misalignment angle $\Phi$, in accordance with one embodiment.

The method of FIG. 10 uses and applies knowledge of the wave plate rotation angles $\phi_1$, $\phi'_2=\phi_2-\Phi$, and a corresponding computed, estimated misalignment angle $\Phi$. The misalignment angle is not measured directly, but is obtained from measurements of $\phi_2$ and $\phi_2'$ (see Eq. 15).

The only angles that can be measured directly are $\phi_1$ and $\phi'_2$; $\phi_2$ must be calculated from the known (e.g., measured) angles and wave plate properties, and is in turn used to calculate an estimated $\Phi$. These angles are relative to the transmitter and receiver polarization axes, respectively, which are fixed with respect to the transmitter and receiver. Using polarization axes as fixed baselines for angular measurements, the angles can be directly measured by the wave plate motor encoders, for example. Angles $\phi_1$ and $\phi_2'$ are measured by the encoders on the wave plate rotation motors, for example.

The method of FIG. 10 repeats, for each update interval, where an update interval is defined as the time between updates in alignment of the transmitter 106 wave plate 102 and receiver 108 wave plate 104. The frequency and duration of these periodic updates depend on a number of things, such as motion and vibration of the platforms to which the transmitter and receiver are attached. In one embodiment, updating is done on a regular schedule, such as periodically (e.g., every 100 milliseconds (ms).). In one embodiment, updating occurs based on predetermined action triggering a need for updating, measuring, and adjusting one or both of the quarter wave plates 102, 104. Illustrative examples of actions, events, or conditions that might result in a need to update and adjust include, but are not limited to, a specific user request, a specific action in the system, detection of an error, detection that channel to channel isolation is not meeting a predetermined requirement or standard, establishment of a new communications link with a new communication platform, a detection of a change in position of one of the two ends of a communication link, a regular schedule whose update rate can be increased under adverse conditions, etc.).

Referring to FIGS. 10-12, at the start (block 200) of the update interval, one part of this update process involves determining $\phi_2$, which is done via blocks 215-235 in FIG. 10 (this also is discussed further herein). In part, the determination of $\phi_2$ is facilitated by rearranging Equation (4), which rearrangement is illustrated in Equation (11) below:

$$\begin{bmatrix} E'_3 \\ E'_4 \end{bmatrix} = K \begin{bmatrix} \cos\phi'_2 & -\sin\phi'_2 \\ \sin\phi'_2 & \cos\phi'_2 \end{bmatrix} \begin{bmatrix} T_x e^{-j\theta_x} & 0 \\ 0 & T_y e^{-j\theta_y} \end{bmatrix}_2 \begin{bmatrix} \cos\phi_2 & \sin\phi_2 \\ -\sin\phi_2 & \cos\phi_2 \end{bmatrix} \quad (11)$$

$$\begin{bmatrix} A_1 & B_1 \\ C_1 & D_1 \end{bmatrix} \begin{bmatrix} E_1 \\ E_2 \end{bmatrix}.$$

In equation 11, the subscripts "1" and "2" denote wave plates 1 and 2 (e.g., the transmitter wave plate 102 and the receiver wave plate 104 in FIGS. 1-2) and are included to emphasize that the wave plates need not be identical. All that is required is knowledge of their properties, which properties can be determined in advance, such as by measurement or retrieval of stored data (e.g., as provided by a manufacturer), etc., as will be understood in the art. The factor K is a (previously omitted) complex factor accounting for phase and attenuation due to propagation from the transmitter to the receiver. This matrix equation (11) can be rearranged as shown in equation (12) as:

$$\begin{bmatrix} Q'_3 \\ Q'_4 \end{bmatrix} = K \begin{bmatrix} \cos\phi_2 & \sin\phi_2 \\ -\sin\phi_2 & \cos\phi_2 \end{bmatrix} \begin{bmatrix} Q_1 \\ Q_2 \end{bmatrix}. \quad (12)$$

where $$\begin{bmatrix} Q_1 \\ Q_2 \end{bmatrix} = \begin{bmatrix} A_1 & B_1 \\ C_1 & D_1 \end{bmatrix}_1 \begin{bmatrix} E_1 \\ E_2 \end{bmatrix}$$

and $$\begin{bmatrix} Q'_3 \\ Q'_4 \end{bmatrix} = \begin{bmatrix} T_x^{-1} e^{j\theta_x} & 0 \\ 0 & T_y^{-1} e^{j\theta_y} \end{bmatrix}_2 \begin{bmatrix} \cos\phi'_2 & \sin\phi'_2 \\ -\sin\phi'_2 & \cos\phi'_2 \end{bmatrix} \begin{bmatrix} E'_3 \\ E'_4 \end{bmatrix}$$

Note that K is a complex factor that accounts for propagation delay and attenuation between the transmitter and the receiver. Its value (the value of K) depends on the gain of the transmitting and receiving antennas, atmospheric conditions, and the distance between transmitter and receiver. Since the value is the same for both polarizations, its actual value is not important for at least some embodiments.

The modified transmitted and received signal vectors $[Q_1,Q_2]$ and $[Q'_3,Q'_4]$, respectively, are entirely determined by directly measured quantities and can be used to determine the angle $\phi_2$. From Equation (12), $$\tan\phi_2 = \frac{\frac{Q'_3}{Q'_4} - \frac{Q_1}{Q_2}}{1 + \frac{Q_1 Q'_3}{Q_2 Q'_4}}. \quad (13)$$

Transmit a reference signal on Channel 1 only, i.e., $E_2=0$, in which case $Q_1/Q_2=A_1/C_1$, completely independent of the transmitted field. In this case, Eq. (11) assumes the form $$\tan\phi_2 = \frac{\frac{Q'_3}{Q'_4} - \frac{A_1}{C_1}}{1 + \frac{A_1 Q'_3}{C_1 Q'_4}}. \quad (14)$$

There is a 180° ambiguity in $\phi_2$; the wave plate itself is invariant to 180° rotations, but the ambiguity must be resolved to correctly determine the value of the misalignment angle $\Phi$, which is given by $$\Phi = \phi_2 - \phi'_2, \quad (15)$$

where the measured angle $\phi'_2$ is the difference $\phi_2 - \Phi$ between the rotation angle $\phi_2$ and the misalignment angle $\Phi$. Note that misalignment angle is not directly measured and is derived from $\phi_2$, which itself is not directly measured. The ambiguity can be resolved by constraining the relative orientations of the transmitter and receiver. For example, in one embodiment, it can be required that the receiver 108 be "upright" relative to the transmitter 106 in that $-90° \leq \Phi \leq 90°$; to resolve the ambiguity, choose the value of $\phi_2$ so that the resulting value of $\Phi$ satisfies $-90° \leq \Phi \leq 90°$. This is not the only way to resolve the ambiguity, as will be understood in the art.

Given the characteristics of the transmitter and receiver quarter-wave plates 102, 104, and the angles $\phi_1$, $\phi'_2$, and $\Phi$, everything needed to correct for non-ideal quarter-wave plate performance is in place and ready to be applied as described herein. Referring to the listed steps below and again to FIGS. 10-12, which together are flow charts of a procedure for determining the approximate operating point utilizing the analytically-derived correction angle β (Equation 10), in accordance with one embodiment, the method, in one embodiment, proceeds as follows:

Referring to the diagrams of FIGS. 1, 2, and the flow-charts of FIGS. 10-12, this process starts, at each update interval (block 200), by measuring the transmitter quarter-wave plate rotation angle $\phi_1$ (from the output of the positioning motor encoder 120A, for example) and communicating the value of $\phi_1$ to the receiver 108 (block 215). In addition, the receiver quarter-wave plate rotation angle $\phi'_2 = \phi_2 - \Phi$ is measured (block 220). Note that the actions in blocks 215 and 220 need not be performed in the exact order listed in FIG. 10. The known properties of the transmitter 106 and receiver 108 wave plates (e.g., from a stored set of those properties (block 230) are retrieved/received (block 225). Based on the measured quarter-wave plate rotation angle $\phi_1$, the receiver quarter-wave plate rotation angle $\phi'_2$, and on the known properties of the transmitter 108 wave plate 102 and receiver 108 wave plate 104, the value of (the receiver quarter-wave plate rotation angle with respect to the transmitter polarization axes) is calculated (block 225 and FIG. 11).

Reference is now made to FIG. 11, which is a flow chart of a method, usable in connection with the method of FIG. 10, for computing receiver quarter-wave plate rotation angle $\phi_2$ with respect to transmitter polarization axes, in accordance with one embodiment. At the start (block 500), the known properties (block 505) of the transmitter 106 and receiver 108 wave plates 102, 104, respectively, as well as the measured value of the transmitter 108 polarizer 102 rotation angle $\phi_1$ are used to compute the transmission matrix coefficients $A_1$-$D_1$ (block 515). To perform a relative phase calibration between the two receive channels (note that only one is shown in FIGS. 1-2, for simplicity), a reference signal is transmitted on channel 1 from the transmitter 106 to the receiver 108 (block 520), where the polarization of channel 1 is parallel to the transmitter 106 polarization axis 1. For example, this can be done by transmitting a single linearly-polarized transmit signal at a 45 degree inclination (block 525). FIG. 1C, for example, shows two linearly polarized inputs, which represent two channels each carrying an independent data stream. The wave plate converts these to RH and LH circular polarization before transmission to the receiver. FIG. 2 is used to illustrate receiver-transmitter geometry, and does not reference the number of channels.

For example, in one embodiment, this is done by transmitting a linearly polarized calibration signal $[E_{T1}, E_{T2}] = [E, 0]$ and/or $[0, E]$ (block 527). This calibration signal has a known polarization, and the receiver 108 knows what the known polarization of the calibration signal should be, based, in one embodiment, on a pre-determined calibration protocol. Based on the received calibration signal at the receiver wave plate 104, a determination can be made about what is the relative orientation between the transmitter 106 and the receiver 108. The orientations of the transmitter wave plate with respect to the transmitter polarization axes can be measured directly. The same is true of the receiver wave plate. The relative orientation between the transmitter and receiver is required, in one embodiment, to determine the orientation between the transmitter and receiver wave plates. This is explained further below. Note also that, in at least some embodiments, phase calibration is not necessary.

The received signal vector $[E'_3, E'_4]$ is measured by the receiver (block 530). For example, in one embodiment, the receiver hardware can make this measurement; the components of the received signal vector can be extracted from the received data stream after demodulation. Then, the known properties of the $2^{nd}$ wave plate and the measured value of $\phi'_2 = \phi_2 - \Phi$ are used to calculate $[Q'_3, Q'_4]$; (block 540). Based on the computations and values in blocks 500-540, tan $\phi_2$ is computed as shown in block 550. Then, as is understood, $\phi_2 = \tan^{-1}$ (tan $\phi_2$). This value of $\phi_2$ is returned for the next blocks in FIG. 10. Referring again to FIG. 10, block 245, based on the values of $\phi_2$ and on the received outputs $[E_{R1}, E_{R2}] = [AE, CE]$, the misalignment angle $\Phi$ is computed (block 245) using the further process blocks in FIG. 12, which is a flow chart of a method, usable with the method of FIG. 10, for computing misalignment angle $\Phi$, in accordance with one embodiment.

Referring to FIGS. 10 and 12, to compute misalignment angle $\Phi$ (block 600), first calculate $\Phi_1$, where $\Phi_1 = \phi_2 - \phi'_2$, (block 610). Then calculate $\Phi_2$, where $\Phi_2 = \phi_2 + \pi - \phi'_2$, (block 620). Base on $\Phi_1$ and $\Phi_2$, $\Phi$ can be determined (block 630). In particular:

$$\Phi = \begin{cases} \Phi_1 = \phi_2 - \phi'_2 & \text{if } -\pi/2 \leq \Phi_1 \leq \pi/2, \\ \Phi_2 = \phi_2 + \pi - \phi'_2 & \text{if } -\pi/2 \leq \Phi_2 \leq \pi/2. \end{cases}$$

Referring again to FIGS. 1, 2, and 10, after the misalignment angle $\Phi$ is determined (block 235 and FIG. 12), a check is made about how large the misalignment angle $\Phi$ is (block 253). In one embodiment, if the misalignment angle $\Phi$ is relatively small (e.g., smaller than some predetermined value, which in one embodiment is 10°), and if quarter wave plate performance is sufficiently good, then the answer at block 253 is "Yes" and correction (e.g., computation of the rotation of quarter wave plates) is not needed, and processing moves to wait until the next update interval (blocks 300-315). In one aspect, "sufficiently good" is "reasonable" (e.g., close to ideal), then transmission coefficients are close to 1 and a differential phase shift $|\theta_x - \theta_y|$ close to 90 degrees.

Else if the misalignment angle $\Phi$ is larger than a predetermined level such as 10° (which is not limiting); that is, the answer at block 253 is "No", then processing moves on to computation of the correction angle β (block 255) from $\Phi$ and the quarter-wave plate phase-shift error δ, (using $\theta_x - \theta_y = 90° + \delta$), where:

$$\beta = \frac{\sin 2\Phi \sin \delta (1 + \sin \delta)}{2[(1 - 3\sin^2 \Phi) \sin^2 \delta + 2\cos 2\Phi \sin \delta + \cos^2 \Phi]}.$$

The processing then moves on to update (and compute) the quarter-wave rotation angles $\phi_1$ and $\phi'_2$ (polarizer rotation angles) (block 260):

$$\phi_1 = [2(n + m) + 1]\frac{\pi}{4} + \frac{\beta}{2},$$

$$\phi'_2 = [2(n - m) - 1]\frac{\pi}{4} - \frac{\beta}{2}.$$

Note that n and m are integers and are derived as explained above. The updated rotation angle $\phi_1$ is transmitted to the transmitter 106 (block 270), and the transmitter 106 polarizer 102 is rotated (e.g., via a command sent from controller/processor 50A to positioning encoder 120A) to the angle $\phi_1$ (block 280). Similarly, receiver 108 quarter wave plate 104 is rotated to angle $\phi'_2$ (block 290). In one aspect, these computations are carried out at the receiver, so no transmission of an updated rotation angle is necessary. The transmitter polarizer 102 and the receiver quarter-wave plate 104 remain (block 315) at the positions to which they are rotated (blocks 300-315), so long as communication continues (block 310) or until the next update interval occurs (block 300). In one embodiment (as described further herein in connection with FIG. 13), the transmitter 106 polarizer 102 and receiver 108 quarter wave plate 104 may be further rotated/adjusted if channel to channel isolation is insufficient.

Update intervals (also referred to as rotation angle update rates) are dependent in at least one embodiment on the system requirements; an exemplary update interval in one embodiment is every 100 ms. Advantageously, in at least some embodiments, the update interval should be as long as possible, because, in these embodiments, whenever the systems 10A, 10B is transmitting calibration signal, it is not communicating (that is, the data stream stops).

Figure 13:
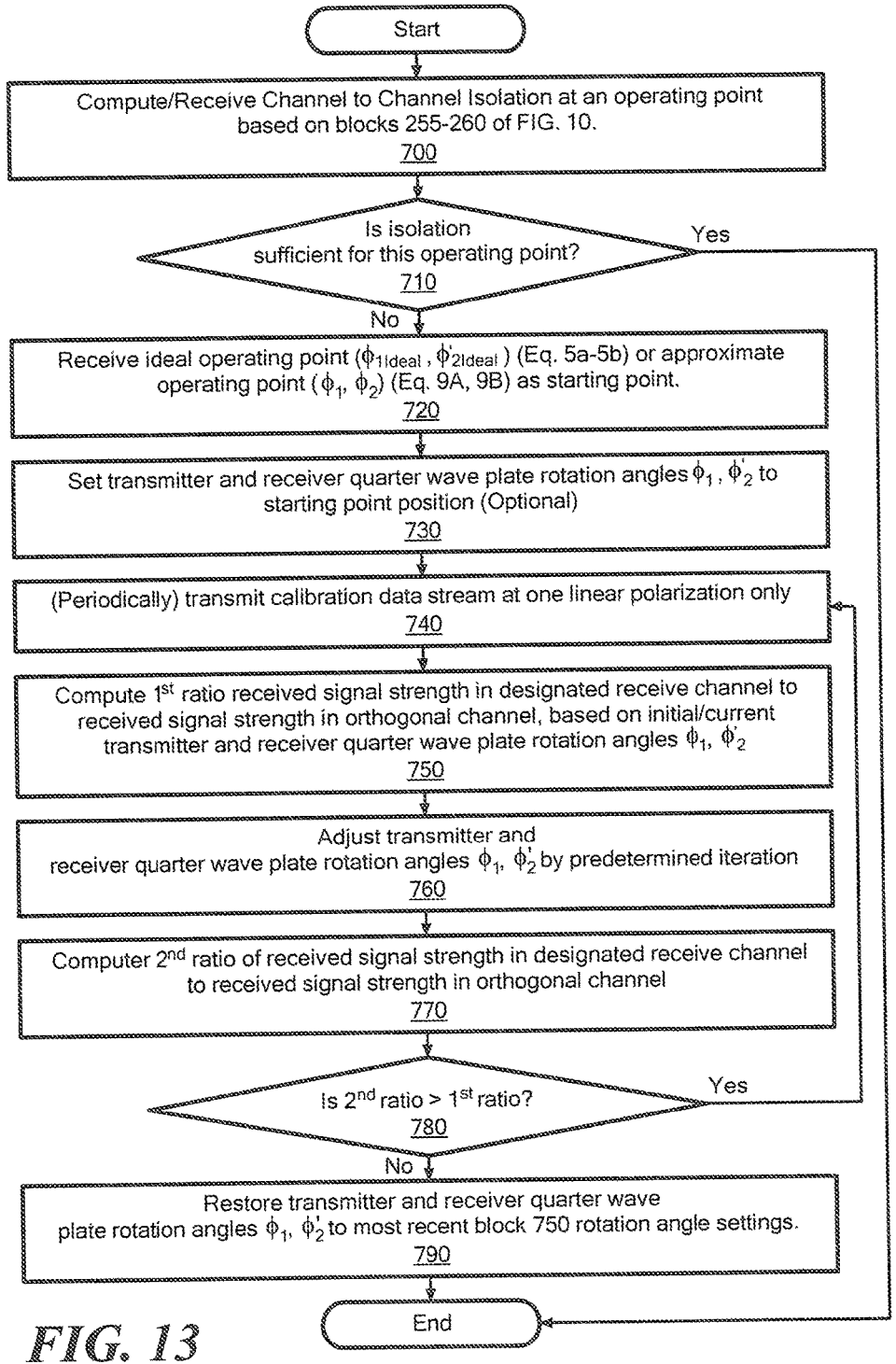
FIG. 13 is a flow chart of a second exemplary method for determining at least one appropriate operating point, which method is usable with at least some embodiments, including at least the systems of FIGS. 1A-1C, the communications link of FIG. 2, and any or all of the methods of FIGS. 10-12, in accordance with one embodiment.

In the event that channel-to-channel isolation is insufficient at the approximate operating point derived from Equation (10), there are other ways to determine one or more alternate operating points that may provide better performance. For example, an iterative minimization algorithm may be used to find an operating point closer to the optimal operating point. FIG. 13 is a flow chart of a second exemplary method for determining appropriate operating point, which method is usable with at least some embodiments, including at least the systems of FIGS. 1A-1C and the communications link of FIG. 2, in accordance with one embodiment. The exemplary method of FIG. 13 determines a suitable operating point using a iterative search algorithm, which in this example uses the ideal operating point (Equation (5)) or the approximate operating point (Equation (9)) as a starting point.

Referring to FIG. 13, at the start, the channel to channel isolation at the "approximate" operating point (see blocks 255-260 of FIG. 10, described above, as well as equations 5A-5B, 6A, 6, and 10 and FIGS. 5A, 5B, and 6, is computed (or received) (block 700). If the isolation at the approximate operating point is sufficient (e.g., satisfies a predetermined requirement) (block 710), then no further processing is necessary, and the method ends. For example, in one embodiment, 64-QAM requires a signal-to-noise ratio (SNR) of 28 dB to achieve a bit-error rate (BER) of $10^{-8}$ or less (i.e., fewer than 1 in $10^8$ bits is in error). 128-QAM requires an SNR of 32 dB to achieve a comparable BER.

If, however, the isolation is insufficient, then processing moves to block 720, where, as a starting point/goal, information is received (block 725) about rotation angles $\phi_1$ and $\phi'_2$ that correspond to one of the ideal operating point (Equations 5A, 5B) or the approximate operating point (Equations 9A, 9B), or some other "stored point" usable as a starting point.

To begin the process of determining an operating point closer to the "optimal" operating point, the rotation angles $\phi_1$ and $\phi'_2$, of the transmitter 106 and receiver 108 quarter-wave plates 102, 104 are set to positions that correspond to a starting point (e.g., the current angles $\phi_1$ and $\phi'_2$ at which the plates are set, or the settings that correspond to the ideal or approximate operating point) (block 730). This step may be skipped if the transmitter 106 and receiver 108 quarter-wave plates already are at a desired starting point. A predetermined calibration data stream is sent from the transmitter 106 to the receiver 108, at one linear polarization only (block 750). Then, a $1^{st}$ ratio is computed (block 750), of received signal strength in the designated receive channel (corresponding to the polarization of the calibration data stream) to that in the orthogonal channel.

The transmitter and receiver quarter-wave plate rotation angles $\phi_1$ and $\phi'_2$ angles are iteratively adjusted, as dictated by the search algorithm, the goal being to maximize the two-channel isolation (block 760). That is, the search algorithm seeks out the quarter-wave plate rotation angles $\phi_1$ and $\phi'_2$ that maximize the ratio of the received signal strength in the designated receive channel. For example, after each iteration adjustment, a $2^{nd}$ ratio is computed (block 770) to see if the ratio is improved as compared to the $1^{st}$ ratio (block 780). If there is improvement, the iterative adjustment continues (blocks 740-780), with the "latest" iteration as the "new" start position, until no more improvement is reached (answer at block 780 is "No"). If the answer at block 760 is "No", then the transmitter and receiver quarter wave plate rotation are restored to their most recent settings that resulted in the largest ratio of signal strength in the designated receive channel to received signal strength in the orthogonal channel (block 790), and then processing ends.

Figure 14:
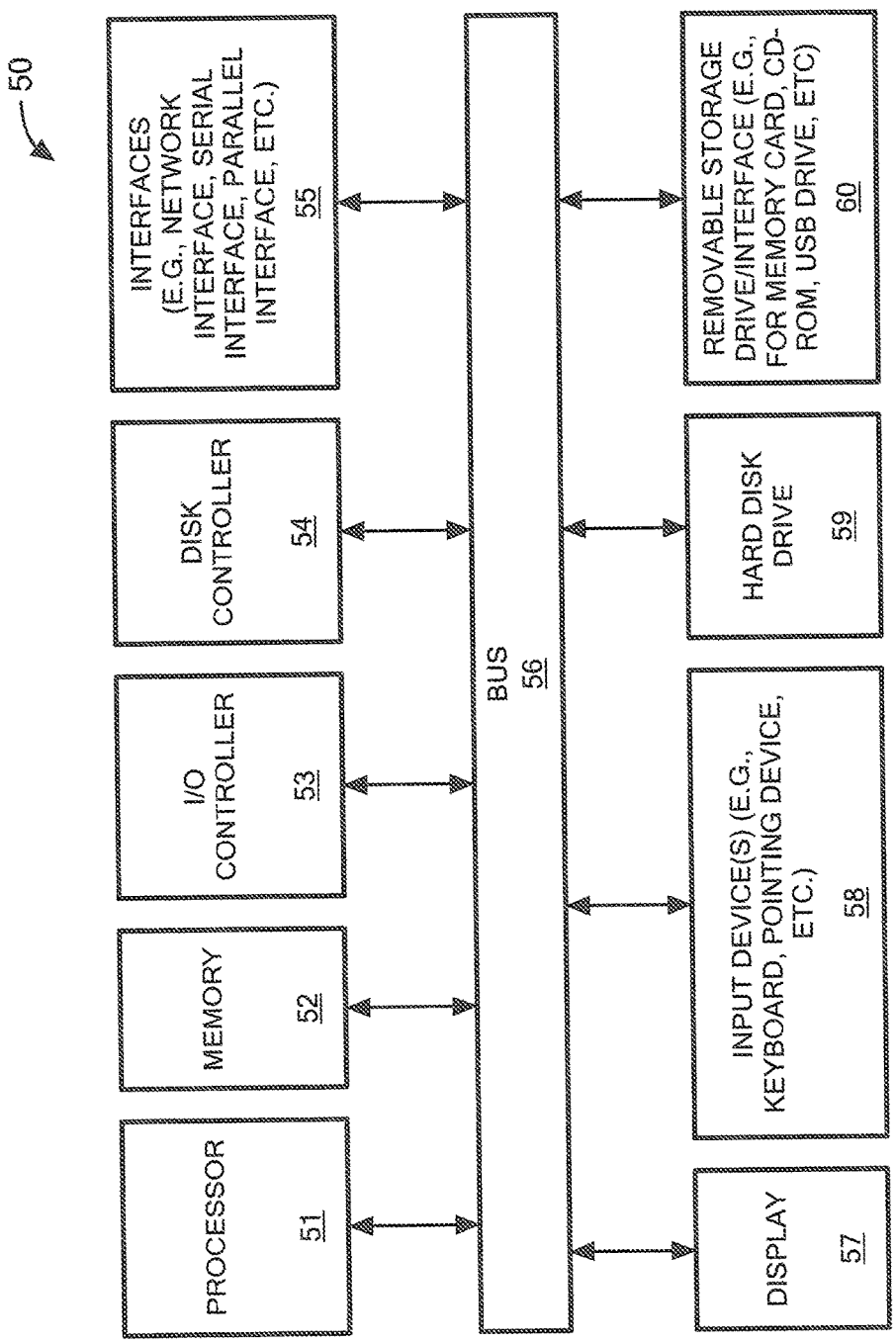
FIG. 14 is a block diagram of a computer system usable with at least some embodiments, including at least the system of FIG. 1A-1C, the communications link of FIG. 2, and the methods of FIGS. 10-12, in accordance with one embodiment.

Reference is made briefly to FIG. 14, which shows a block diagram of a computer system 50 usable with at least some embodiments, including at least the communications link of FIG. 2 the methods of FIGS. 10-13, and the system block diagrams of FIGS. 1A-1C, in accordance with one embodiment. For example, the computer system 50 can be used to implement the controller/processor 50A and/or the controller processor 50B of FIGS. 1A-1C. The computer system 50 also can be used to implement all or part of any of the methods, equations, and/or calculations described herein.

Referring again to the computer system 50 of FIG. 14, systems and methods in accordance with at least some embodiments can be implemented using any type of computer system running any one or more types of operating systems. Exemplary types of computer systems on which at least some embodiments can be embodied include any system or device having a processor (or equivalent processing functionality) installed or embedded, including but not limited to a desktop computer, personal computer (PC), laptop computer, notebook computer, tablet computer, handheld computer, netbook, personal digital device (including but not limited to personal digital assistant (PDA), mobile communications device (including but not limited to radio, conventional telephone, mobile/cellular telephone, smart phone, combination phone-tablet computer, music playing device, electronic reading device) server, workstation, and interconnected group of computers, as well as any other type of device having a microprocessor installed or embedded thereto, such as a field-programmable gate array (FPGA).

The exemplary computer system 50 of FIG. 14 includes a central processor 1, associated memory 2 for storing programs and/or data, an input/output controller 3, a disk controller 4, a network interface 5, a display device 7, one or more input devices 8, a fixed or hard disk drive unit 9, a removal storage device/drive (optional) 13, optionally a backup storage device (e.g., a tape drive unit) (not shown) and a data bus 6 coupling these components to allow communication therebetween.

The central processor 1 can be any type of microprocessor, such as a PENTIUM-family processor, made by Intel of Santa Clara, Calif. The display device 7 can be any type of display, such as a liquid crystal display (LCD), plasma display, cathode ray tube display (CRT), light emitting diode (LED), and the like, capable of displaying, in whole or in part, any desired information. The input device 8 can be any type of device capable of providing the desired inputs, such as keyboards, numeric keypads, touch screens, pointing devices, switches, styluses, and light pens. The network interface 5 can be any type of a device, card, adapter, or connector that provides the computer system 50 with network access to a computer or other device, such as a printer. For example, the network interface 5 can enables the computer system 50 to connect to a computer network such as the Internet. Other computer accessories that are now known or developed in the future (e.g., microphones, cameras, speakers, biometric access-control devices such as fingerprint scanners, etc.), although not illustrated in the block diagram of FIG. 14, can of course be included as part of the computer system 50.

Computer systems embodying at least some embodiments described herein need not include every element shown in FIG. 14, and that equivalents to each of the elements are intended to be included within the spirit and scope of the described embodiments.

In at least one embodiment, one or more computer programs define at least some of the operational capabilities of the computer system 50. These programs can be loaded into the computer system 50 in many ways, such as via the hard disk drive 9, the removable storage driver 13, or the network interface 5 (e.g., wirelessly, via the Internet, etc.). Alternatively, the programs can reside in a permanent memory portion (e.g., a read-only-memory (ROM)) chip) of the main memory 2. In another embodiment, the computer system 50 can include specially designed, dedicated, hard-wired electronic circuits that perform all functions described herein without the need for instructions from computer programs.

In at least one embodiment, the computer system 50 is networked to other devices, such as in a client-server or peer to peer system. The computer system 50 can, for example, be a client system, a server system, or a peer system. In addition, at least one embodiment is implemented at the server side and receives and responds to requests from a client, such as a reader application running on a user computer.

The client can be any entity, such as a the computer system 50, or specific components thereof (e.g., terminal, personal computer, mainframe computer, workstation, handheld device, electronic book, personal digital assistant, peripheral, etc.), or a software program running on a computer directly or indirectly connected or connectable in any known or later-developed manner to any type of computer network, such as the Internet. A client may also be a notebook computer, a handheld computing device (e.g., a PDA), an Internet appliance, a telephone, an electronic reader device, or any other such device connectable to the computer network.

The server can be any entity, such as the computer system 50, a computer platform, an adjunct to a computer or platform, or any component thereof, such as a program that can respond to requests from a client. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

In addition, software embodying at least some embodiments resides in an application running on the computer system 50. At least one embodiment is embodied in a computer-readable program medium usable with the general purpose computer system 50. At least one embodiment is embodied in a data structure stored on a computer or a computer-readable program medium. At least one embodiment is embodied in an application programming interface (API) or a user interface. In addition, at least one embodiment is embodied in a data structure.

It should be noted that because of the reciprocity law of passive circuits, the transmit and receive functions of the described systems 10A, 10B and communication link 100 are interchangeable on this structure. That is, everywhere in this description and in the figures referenced herein, the word receive is used it can be replaced with transmit and likewise transmit can be replaced by receive, should the application be better served by such an arrangement. Independent of the order of transmit versus receive, the described circuits are usable for many different types of communications systems, optics transmission systems, and/or system that use any type of wave plate using any type of polarization, as will be appreciated.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments.

Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety.

What is claimed is:

1. A method for transmitting signals from a first communication node to a second communication node, the method comprising:
    receiving first and second data streams to be transmitted from the first communication node;
    converting the first and second data streams to first and second orthogonal linearly polarized signals;
    receiving the first and second orthogonal linearly polarized signals at a first polarizer, the first polarizer oriented at a first rotation angle, wherein the first polarizer converts the first and second orthogonal linearly polarized signals to, respectively, a first righthand-circularly polarized (RHCP) signal and a first left-hand circularly polarized (LHCP) signal;

combining the first RHCP signal and first LHCP signal into a transmitted signal having a first signal strength and providing the transmitted signal transmitted to a receiver; and adjusting the first rotation angle to substantially increase isolation between third and fourth orthogonal linearly polarized signals at the receiver, the adjusting comprising dynamically adjusting the first rotation angle in accordance with a redetermined periodic rotation angle update rate, wherein the third and fourth orthogonally linearized polarize signals are derived, respectively, from the transmitted signal received at the receiver, and correspond, respectively to transmitted versions of the first and second linearly polarized signals, wherein the adjusting is based at least in part on a real-time analysis of a transmission loss of the of the third and fourth orthogonal linearly polarized signals as compared to the transmitted signal as sent by the transmitter.

2. The method of claim 1, wherein the adjustment of the first rotation angle is further based at least in part on information relating to the second rotation angle of a second polarizer configured to receive the transmitted signal.

3. The method of claim 2, further comprising providing information usable to adjust the second rotation angle to substantially increase isolation between the third and fourth orthogonal linearly polarized signals at the receiver, wherein the adjusting is based at least in part on the real-time analysis of the transmission loss of the of the third and fourth orthogonal linearly polarized signals as compared to the transmitted signal as sent by the transmitter.

4. The method of claim 2, further comprising adjusting the first rotation angle based at least in part on computation of a misalignment angle between the first and second rotation angles.

5. The method of claim 4, wherein the computation provides an estimation of the misalignment angle.

6. The method of claim 4, wherein determining the misalignment angle is based at least in part on a real-time measurement of at least one of the first and second rotation angles.

7. The method of claim 6, wherein determining the misalignment angle is based at least in part on at least one property of at least one of the first and second polarizers.

8. The method of claim 7, further comprising;
computing at least one operating point based at least in part on at least one of the first rotation angle, second rotation angle, and at least one property of at least one of the first and second wave plates, wherein the at least one operating point corresponds to a transmitter and receiver rotational angle arrangement configured to achieve at least a predetermined level of isolation between the third and fourth orthogonal linearly polarized signals.

9. The method of claim 8 wherein the at least one operating point corresponds to a transmitter and receiver polarizer rotational angle arrangement that is configured to substantially maximize the level of isolation between the third and fourth orthogonal linearly polarized signals.

10. The method of claim 1, wherein at least one of the first and second communication nodes is in motion relative to the other of the first and second communication nodes.

11. The method of claim 1, wherein the first and second orthogonal linearly polarized signals are oriented so as to be parallel to the orthogonal axes of the first quarter wave plate.

12. The method of claim 2, wherein the second and third orthogonal linearly polarized signals are oriented to be substantially parallel to rotated polarization axes of the second quarter wave plate.

13. The method of claim 2, further comprising;
measuring at least one of the first and second rotation angles;
calibrating a phase between the first and second orthogonal linearly polarized signals;
computing, based at least in part on least one of a property of at least one of the first and second polarizers and on measurement of at least one of the first and second rotation angles, a misalignment angle between the first and second polarizers;
determining, based at least in part on least one of the property of at least one of the first and second polarizers, on the measurement of at least one of the first and second rotation angles, and on the misalignment angle, a correction angle and phase shift error associated with at least one of the first and second polarizers; and
rotating at least one of the first and second polarizers to a respective first or second rotation angle selected in accordance with the correction angle and phase shift error, wherein the rotating is configured to substantially compensate for at least one of the misalignment angle and phase shift error between the first and second polarizers.

14. A communication system, comprising:
a signal generator configured to convert first and second received data streams into respective first and second orthogonal linearly polarized signals;
a first polarizer oriented at a first rotation angle and configured to be in operable communication with the signal generator, the first polarizer further configured to convert the first and second orthogonal linearly polarized signals to respective first and second orthogonal linearly polarized signals wherein the first polarizer converts the first and second orthogonal linearly polarized signals to, respectively, a first right-hand-circularly polarized (RHCP) signal and a first left-hand circularly polarized (LHCP) signal;
a signal combiner in operable communication with the first polarizer, the signal combiner configured to combine the first RHCP signal and first LHCP signal into a transmitted signal having a first signal strength;
a transmitter in operable communication with the signal combiner, the transmitter configured to provide the transmitted signal to a receiver,
a positioning device in operable communication with the polarizer, the positioning device configured to adjust the first rotation angle to substantially increase isolation between third and fourth orthogonal linearly polarized signals at the receiver, wherein the adjusting is based at least in part on a real-time analysis of a transmission loss of the of the third and fourth orthogonal linearly polarized signals, wherein the third and fourth orthogonally linearized polarize signals are derived, respectively, from the transmitted signal received at the receiver, and correspond, respectively to transmitted versions of the first and second linearly polarized signals; and
a controller in operable communication with the positioning device, the controller configured to perform the real-time analysis, to direct the positioning device to adjust the first rotation angle, and to dynamically adjust the first rotation angle in accordance with a predetermined periodic rotation angle update rate.

15. The communication system of claim 14, wherein the adjustment of the first rotation angle is further based at least in part on at least one of:
  (a) information relating to the second rotation angle of a second polarizer configured to receive the transmitted signal;
  (b) computation of a misalignment angle between the first and second rotation angles;
  (c) a real-time measurement of at least one of the first and second rotation angles; and
  (d) at least one property of at least one of the first and second polarizers.

16. The communication system of claim 15, wherein the controller is configured to determine at least one operating point based at least in part on at least one of the first rotation angle, second rotation angle, and at least one property of at least one of the first and second polarizers, wherein the at least one operating point corresponds to a transmitter and receiver rotational angle arrangement configured to achieve at least a predetermined level of isolation between the third and fourth orthogonal linearly polarized signals.

17. The communication system of claim 14, wherein at least one of the transmitter and receiver is in motion relative to the other.

18. The communication system of claim 14, wherein the controller is configured to:
  measure at least one of the first and second rotation angles;
  calibrate a phase between the first and second orthogonal linearly polarized signals;
  compute, based at least in part on least one of a property of at least one of the first and second polarizers and on measurement of at least one of the first and second rotation angles, a misalignment angle between the first and second polarizers;
  determine, based at least in part on least one of the property of at least one of the first and second polarizers, on the measurement of at least one of the first and second rotation angles, and on the misalignment angle, a correction angle and phase shift error associated with at least one of the first and second polarizers; and
  rotate at least one of the first and second polarizers to a respective first or second rotation angle selected in accordance with the correction angle and phase shift error, wherein the rotating is configured to substantially compensate for at least one of the misalignment angle and phase shift error between the first and second polarizers.

19. The communications system of claim 14, wherein the first and second orthogonal linearly polarized signals are oriented so as to be parallel to the orthogonal axes of the first quarter wave plate.

20. The communications system of claim 14, wherein the second and third orthogonal linearly polarized signals are oriented to be substantially parallel to rotated polarization axes of the second quarter wave plate.

* * * * *